(12) United States Patent
Nakagiri et al.

(10) Patent No.: US 7,394,562 B2
(45) Date of Patent: Jul. 1, 2008

(54) INFORMATION PROCESSING APPARATUS AND METHOD

(75) Inventors: Koji Nakagiri, Kanagawa (JP); Shigeo Nara, Kanagawa (JP); Yasuo Mori, Kanagawa (JP); Takuya Miyazato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 10/236,553

(22) Filed: Sep. 9, 2002

(65) Prior Publication Data

US 2003/0053133 A1    Mar. 20, 2003

(30) Foreign Application Priority Data

Sep. 14, 2001 (JP) ............................. 2001-280607
Jul. 8, 2002 (JP) ............................. 2002-199218

(51) Int. Cl.
*H04N 1/387* (2006.01)
*G06K 15/02* (2006.01)
*G06F 3/12* (2006.01)

(52) U.S. Cl. ..................... 358/1.18; 358/1.13; 358/1.9; 358/4.52

(58) Field of Classification Search ....................... None
See application file for complete search history.

(56) References Cited

U.S. PATENT DOCUMENTS

| | | | | |
|---|---|---|---|---|
| 5,241,474 A | * | 8/1993 | Marovac .................... | 715/530 |
| 5,442,732 A | * | 8/1995 | Matysek et al. ............ | 358/1.17 |
| 5,617,518 A | * | 4/1997 | Kuwamoto et al. ........ | 358/1.15 |
| 5,715,381 A | * | 2/1998 | Hamilton ................... | 358/1.15 |
| 5,812,862 A | * | 9/1998 | Smith et al. ................ | 715/515 |
| 6,055,036 A | * | 4/2000 | Takahashi ................... | 355/25 |
| 6,173,295 B1 | * | 1/2001 | Goertz et al. ............... | 715/505 |
| 6,237,011 B1 | * | 5/2001 | Ferguson et al. ........... | 715/515 |
| 6,332,149 B1 | * | 12/2001 | Warmus et al. ............ | 715/517 |
| 6,411,400 B1 | | 6/2002 | Mori ......................... | 358/1.2 |
| 6,417,931 B2 | | 7/2002 | Mori et al. ................. | 358/1.15 |
| 6,616,702 B1 | * | 9/2003 | Tonkin ....................... | 715/515 |
| 6,839,527 B2 | * | 1/2005 | Dennison et al. ........... | 399/83 |
| 6,985,245 B1 | | 1/2006 | Takahashi ................... | 358/1.15 |
| 6,995,860 B2 | * | 2/2006 | Roztocil et al. ............ | 358/1.18 |
| 6,999,198 B1 | | 2/2006 | Nakagiri et al. ............ | 358/1.9 |
| 7,046,385 B2 | * | 5/2006 | Mori et al. ................. | 358/1.15 |
| 7,072,071 B2 | * | 7/2006 | Kujirai et al. .............. | 358/1.18 |
| 2002/0026453 A1 | | 2/2002 | Mori et al. ................ | 707/104.1 |

(Continued)

FOREIGN PATENT DOCUMENTS

EP        895184  A2  *  2/1999

(Continued)

*Primary Examiner*—Twyler L. Haskins
*Assistant Examiner*—Myles D Robinson
(74) *Attorney, Agent, or Firm*—Fitzpatrick, Cella, Harper & Scinto

(57) ABSTRACT

An object of this invention is to provide an apparatus and method capable of printing part of a book file by designating the range. A setting user interface window is displayed from a print setting menu, a desired unit is selected from a print target column, and the range is designated in the selected unit. The designated range is printed including an original page within the designated range and another original page to be printed on the same paper sheet as that of the original page. The range can be designated by an entire book file, chapter, page, or booklet.

12 Claims, 36 Drawing Sheets

U.S. PATENT DOCUMENTS

| | | | |
|---|---|---|---|
| 2003/0011802 A1 | 1/2003 | Nakagiri et al. | 358/1.13 |
| 2003/0056177 A1* | 3/2003 | Nara et al. | 715/525 |
| 2005/0138551 A1* | 6/2005 | Elazar et al. | 715/525 |
| 2005/0254093 A1* | 11/2005 | Park | 358/1.18 |
| 2006/0158706 A1* | 7/2006 | Mori et al. | 358/540 |

FOREIGN PATENT DOCUMENTS

| | | | |
|---|---|---|---|
| EP | 971288 A2 * | 1/2000 | |
| EP | 1 098 243 | 5/2001 | |
| EP | 1 098 266 | 5/2001 | |
| JP | 1-93385 | 4/1989 | |
| JP | 6-251014 | 9/1994 | |
| JP | 7-104455 | 4/1995 | |
| JP | 11-157160 | 6/1999 | |
| JP | 11-219247 | 8/1999 | |
| JP | 11-305982 | 11/1999 | |
| JP | 2000025276 A * | 1/2000 | |
| JP | 2000218889 A * | 8/2000 | |
| JP | 2001-136364 | 5/2001 | |
| JP | 2001-195220 | 7/2001 | |
| KR | 2001084544 A * | 9/2001 | |

* cited by examiner

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | ORIGINAL SIZE / FIXED SIZE | • Z-FOLD IS DESIGNATED WHEN "A4+A3", "B4+B3", OR LETTER+LEDGER (11 x 17)" IS DESIGNATED<br>• ORIGINAL SIZE OF FIRST CHAPTER/PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | • ON/OFF CAN BE AUTOMATICALLY DESIGNATED WHEN PAPER SIZE IS FIXED SIZE OR N-up PRINTING IS SELECTED |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 4B

| | | |
|---|---|---|
| 8 | HEADER / FOOTER | • HEADER / FOOTER CAN BE DESIGNATED INDIVIDUALLY IN LOGICAL OR PHYSICAL PAGES<br>• ALL CHAPTERS / PAGES ARE TARGETED |
| 9 | DISCHARGE METHOD | STAPLE / PUNCH HOLE | • STAPLING / PUNCHING ONLY IN SINGLE- / DOUBLE-SIDED PRINTING<br>• STAPLING AT ONE / TWO POSITIONS |
| 10 | DETAILS OF BOOKBINDING | OPENING DIRECTION / SADDLE STITCH / ENLARGEMENT & REDUCTION DESIGNATION / BINDING MARGIN / FASCICLE DESIGNATION, etc. | • ONLY IN BOOKBINDING PRINTING |
| 11 | FRONT / BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING CANNOT BE DESIGNATED |
| 14 | CHAPTERING | "NONE" / "PAGE BREAK" / "PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON / OFF CAN BE AUTOMATICALLY DESIGNATED WHEN PAPER SIZE IS FIXED SIZE OR N-up PRINTING IS SELECTED |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DISCHARGE METHOD | STAPLE | • STAPLE CAN BE SET OFF WHEN STAPLE IS DESIGNATED BY BOOK. DEFAULT VALUE IS "ON" |

FIG. 6

| NO | ATTRIBUTE INFORMATION | | REMARKS |
|---|---|---|---|
| 1 | PAGE ROTATION DESIGNATION | | • 0°/90°/180°/270° CAN BE DESIGNATED |
| 2 | WATERMARK | DISPLAY/ NON-DISPLAY | • WHETHER TO DISPLAY ALL WATERMARKS DESIGNATED BY BOOK IS DESIGNATED |
| 3 | HEADER/FOOTER | DISPLAY/ NON-DISPLAY | • WHETHER TO DISPLAY ALL HEADERS/FOOTERS DESIGNATED BY BOOK IS DESIGNATED |
| 4 | ZOOM | 50% - 200% | • MAGNIFICATION RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

FIG. 22

Detailed Settings of Book — 2201

| Page Settings | Finishing | Edit | Paper Feed |

Printing Method:
- ○ Single-Sided Printing
- ○ Double-Sided Printing
- ● Bookbinding Printing

2202

Opening Direction: ▢ Open to Left ▶

2203

- ☐ Saddle Stitch
- ☐ Set Binding Margin
- ☐ Shift Original to Binding Position
- ● Reduce in Accordance with Print Region
- ○ Move in Accordance with Binding Width ☐ Use Trimmer  [5] mm (0~30)

Adjust Original:

Bookbinding Printing Method:
- ○ Print All Pages at Once
- ● Print in Several Bundles
  [2] Sheets in Bundle (1 to 99 Sheets)

2204

Chaptering: [None ▶]

[OK]  [Cancel]  [Apply (A)]  [Restore Defaults]  [Help]

FIG. 24

Print

Printer Name (P): Ganon iR2200-3300 LIPS  ▶  Properties...

Copies: 1

☑ Collate

Print What: Bundle (Booklet) ▶ ~2401

Enter Arbitrary Bundles (Booklets):

[ 2402 ] Bundles (Booklets)

Enter page numbers / number of records separated by commas such as 1, 3, 6, or select page / record ranges such as 4-8

OK    Cancel

```
+ <PrintParams AlternateOutput="Off" CPRollCutWay="none" Class="Parameter'
DeviceModel="" EnableNewJobStart="true" FourPostCard="Off" ID="cnedjtid_0000000002"
MixedSheet="Off" PDLFamily="" PDLVersion="" PrintoColorType="NotCare"
PrintPaperSaving="Off" PrintSheetList="1~-1" SheetCombination="A4 A3"    ⎫
SheetPattern="Pattern1" status="available" VariableDivideRecords="0"     ⎬ 2701
VariableRecordList="1~-1" zfold="off">                                   ⎭
```

FIG. 28A

```
<?xml version="1.0" encoding="Shift_JIS" ?>
- <JDF CANONJT:ExtendedVersion="1.26" DescriptiveName="this is template for eJTH_create"
    ID="cnedjtid_0000000000" JobID="job-0001" Status="waiting" Type="Product" Version="1.0"
    xmlns="http://www.job-definition-format.org/JDFSchema_1"
    xmlns:CANOJT="http://www.canon.co.jp/2001/eDocJobTicket">
    + <CustomerInfo>
    <NodedInfo FirstStart="2002-04-27T02:08:15+09:00" LastEnd="" />
  - <ResourcePool>
    + <PrintParams AlternateOutput="Off" CPRollCutWay="none" Class="Parameter"
        DeviceModel="" EnableNewJobStart="true" FourPostCard="Off" ID="cnedjtid_0000000002"
        MixedSheet="Off" PDLFamily="" PDLVersion="" PrintoColorType="NotCare"
        PrintPaperSaving="Off" PrintSheetList="1~-1" SheetCombination="A4 A3"
        SheetPattern="Pattern1" status=available" VariableDivideRecords="0"
        VariableRecordList="1~-1" Zfold="off">
      <Device CANONJT:PrinterFriendlyCode="0x43616e6f6e206952313035204c495053" ID="cnedjtid_0000000003"
        Class="Implementation" DeviceID="Canon iR105 LIPS"
        status="available" />
```

+ <LayoutElement Class="Parameter" ElementType="Document" ID="cnedjtid_0000000004" Status="available">

+ <Media CANOJT:AlignmentPosition="Left" CANOJT:CPCAMediaType="stationery" CANOJT:CPCAMediaTypeOption="notcare" CANOJT:TabWidth="31" Class="Consumable" Dimension="595 842" HoleCount="0" ID="cnedjtid_0000000005" MediaType="Paper" MediaUnit="Sheet" PartIDKeys="SignatureName" Status="available" >

+ <RunList Class="Parameter" ID="cnedjtid_0000000006" NPage="1" Pages="0~0" Status="available" rRefs="cnedjtid_0000000004">

+ <IDPrintingParams Class="Parameter" ID="cnedjtid_0000000007" PartIDKeys="DocSheetIndex" PrintQuality="normal" SheetCollate="true" Status="available">

<Component Class="Quantity" ID="cnedjtid_0000000008" Status="unavailable"
<Component Class="Quantity" ID="cnedjtid_0000000009" Status="unavailable"
+ <PDFInterpretingParams Center="true" Class="Parameter" ID="cnedjtid_0000000010" Status="available">

F I G. 28B

```xml
- <Layout Class="Parameter" ID="cnedjtid_0000000019" Status="Available">
  + <MediaSource ManualFeed="false" MediaLocation="">
    - <Signature Name="Signature1">
      + <MediaSource MediaLocation="Auto">
      - <Sheet CANOJT:Sides="OneSided">
        + <Surface CANOJT:SurfaceColor="mono" Class="Parameter" ID="cnedjtid_0000000020"
          Side="Front">
        </Sheet>
      </Signature>
    + <Signature Name="Signature2">
    + <Signature Name="Signature3">
  </Layout>
</ResourcePool>
+ <JDF Activation="active" DescriptiveName="eDocJobTicket main" ID="cnedjtid_0000000018"
  JobPartID="1" Status="waiting" Type="Combined" Types="IDPrinting Imposition"
  Version="1.0">
</JDF>
```

```
3101 ─┬─ <Sheet CANOJT:Sides="TwoSidedLongEdge">
      │     <Surface  CANOJT:SurfaceColor="mono"  Class="Parameter"  ID="cnedjtid_0000000021"
      │   Side="Front">
3103 ─┤     <Contentobject    CTM="0.706638655462185    0.    0.    0.706638655462185    0.25
      │   1.025210084037550e-002"  ClipBox="14.4  14.35  420.7  580.6"  ID="cnedjtid_0000000022"
      │   Ord="0" />
      │     <Contentobject    CTM="0.706638655462185    0.    0.    0.706638655462185    421.25
      │   1.025210084026180e-002"  ClipBox="421.25  14.35  827.15  580.6"  ID="cnedjtid_0000000023"
      │   Ord="1" />
      │     </Surface>
3102 ─┬─    <Surface  CANOJT:SurfaceColor="mono"  Class="Parameter"  ID="cnedjtid_0000000024"
      │   Side="Back">
3103 ─┤     <Contentobject    CTM="0.706638655462185    0.    0.    0.706638655462185    0.25
      │   1.025210084037550e-002"  ClipBox="14.4  14.35  420.7  580.6"  ID="cnedjtid_0000000025"
      │   Ord="2" />
      │     <Contentobject    CTM="0.706638655462185    0.    0.    0.706638655462185    421.25
      │   1.025210084026180e-002"  ClipBox="421.25  14.35  827.15  580.6"  ID="cnedjtid_0000000026"
      │   Ord="3" />
      │     </Surface>
      └─  </Sheet>
```

FIG. 33

JOB INITIALIZATION COMMAND
- NUMBER OF COPIES
- RESOLUTION
- ・・・

SHEET INITIALIZATION COMMAND
- PAPER SIZE
- FEED PORT
- TWO SURFACES

DRAWING DATA ON UPPER SURFACE OF FIRST SHEET
- TEXT
- GRAPHIC
- IMAGE
- PAGE BREAK

DRAWING DATA ON LOWER SURFACE OF FIRST SHEET
- TEXT
- GRAPHIC
- IMAGE
- PAGE BREAK / DISCHARGE

DRAWING DATA ON UPPER SURFACE OF SECOND SHEET
- TEXT
- GRAPHIC
- IMAGE
- PAGE BREAK

・・・

SHEET INITIALIZATION COMMAND
- PAPER SIZE

DRAWING DATA ON UPPER SURFACE OF NTH SHEET
- TEXT
- GRAPHIC
- IMAGE
- PAGE BREAK

・・・

INFORMATION PROCESSING APPARATUS AND METHOD

FIELD OF THE INVENTION

The present invention relates to an information processing apparatus and method which provide an editing function for, e.g., document data generated by a document processing program.

BACKGROUND OF THE INVENTION

Different types of data such as characters, tables, and images require different structures which define the data and different editing operations for the data. Various application programs are provided in accordance with the type of data. The user uses different applications for different types of data: a character processing program in order to edit characters, a spreadsheet program in order to edit tables, and an image editing program in order to edit images.

In this way, the user generally uses different application programs for different types of data. In general, a document to be created by the user is made up of a plurality of types of data such as characters and tables, or characters and images, rather than a document formed from only one type of data such as characters, tables, or images. To create a target document containing a plurality of types of data, the user must use the printing functions of various applications to print data by the respective applications, and combine the print materials in a desired order.

Some programs such as so-called "Office Suite" which forms one integrated application from various applications provide a function of combining data generated by respective applications into one document. The use of the integrated application allows the user to combine data created by respective applications into one target document by using a specific application included in the integrated application.

However, to assign page numbers to pages when the user creates one target document by combining print materials generated by various applications, he/she must print out all necessary data, combine them into a document, and determine page numbers. Each application writes determined page numbers on respective pages (to be referred to as logical pages or original pages) of an original created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by an application when not data contents but merely the format is changed such that a plurality of original pages are combined into one page (to be referred to as a physical page or print page) as a print material, or single-sided printing is changed to double-sided printing.

Since an application which can manage data changes depending on the type of data, the user must manually provide an interface between applications. This means that much labor is demanded of the user, decreasing the productivity. The many manual operations readily generate errors.

The use of an integrated application for creating a target document enables arranging various data in the data state without printing them out. No heavy labor is required in comparison with creation of a target document by combining print materials. However, applications for editing and creating various data are restricted to ones included in the integrated application, so a user-desired application is not always exploited. A target document created by the integrated application is one document file, and management such as editing and output is done for each file. The application function poses many constraints on setting the format of part of the document file. For example, the user must change format settings at each portion where the format is changed, and print a target page again. This leads to much labor and low productivity, similar to the above-mentioned method.

Even if a document is printed again after correction or the like, the whole document must be printed again in the prior art, or the range must be designated and printed in original pages. Printing the whole document again with respect to partial correction wastes the resource, and decreases the productivity of all users who share the printing apparatus. In particular, to designate a target print range in original pages for a document having a layout in which a plurality of original pages are laid out on one sheet, the user must convert a portion to be printed into an original page range. This operation is cumbersome, readily generates errors, and decreases the productivity.

SUMMARY OF THE INVENTION

The present invention has been made in consideration of the above situation, and has as its object to provide an information processing apparatus and method which facilitate designating a target print range in a document, and increase the availability and productivity.

It is another object of the present invention to provide an information processing apparatus and method which enable creating and editing a document made up of data created by user-desired application programs, and increase the operability and document editing productivity.

To achieve the above objects, the present invention has the following arrangement.

There is provided an information processing apparatus which performs, for document data, print setting including print format setting of a print material to be printed by a printing apparatus, comprising management means for managing generated document data, designation means for designating a page to be printed by an original page serving as a page generated by an application, determination means for determining a print paper sheet on which the original page designated by the designation means is laid out, out of print paper sheets to be printed by the printing apparatus, on the basis of the print format setting set in the document data, and control means for acquiring, from the management means, document data corresponding to all original pages to be laid out on the print paper sheet determined by the determination means, and controlling an output so as to print the document data by the printing apparatus, wherein the print format setting includes setting of laying out a plurality of original pages on one print paper sheet.

According to another arrangement, there is provided an information processing apparatus which performs, for document data, print setting including print format setting of a print material to be printed by a printing apparatus, comprising management means for managing generated document data, designation means for designating a page to be printed by a serial number of a print paper sheet to be printed by the printing apparatus, determination means for determining an original page to be laid out on the print paper sheet having the serial number designated by the designation means out of print paper sheets to be printed by the printing apparatus, and control means for acquiring, from the management means, document data corresponding to all original pages determined by the determination means, and controlling an output so as to print the document data by the printing apparatus.

According to still another arrangement, there is provided an information processing apparatus which performs print setting when document data is printed by a printing apparatus, comprising setting storage means for storing a print setting window for selecting which of an original page serving as a page generated by an application and a serial number of a print paper sheet to be printed by the printing apparatus is used to designate a range to be printed, and for inputting the range to be printed that is designated by a selected one of the original page and the serial number of the print paper sheet, and storing print range setting information input from the print setting window, and control means for controlling an output so as to print, by the printing apparatus, document data of the range designated by the selected one of the original page and the serial number of the print paper sheet on the basis of the print range setting information stored in the setting storage means.

According to still another arrangement, there is provided an information processing apparatus which performs, for document data, print setting including print format setting of a print material to be printed by a printing apparatus, comprising management means for managing generated document data separately in a plurality of set chapters, designation means for designating a print target by an arbitrary chapter number, determination means for determining an original page of document data included in the chapter number designated by the designation means from the document data managed by the management means, and control means for acquiring, from the management means, document data corresponding to all original pages determined by the determination means, and controlling an output so as to print the document data by the printing apparatus.

According to still another arrangement, there is provided an information processing apparatus which performs print setting when document data is printed by a printing apparatus, comprising designation means for designating a range to be printed by a booklet when bookbinding printing of sectioning the range into a plurality of booklets and printing the range in the booklets is set as a print format, and control means for controlling an output so as to print, by the printing apparatus, the document data corresponding to an original page laid out in a designated booklet, on the basis of the print range of the booklet designated by the designation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIG. 22 is a view showing an example of a printing method (bookbinding printing) designation window;

FIG. 24 is a view showing an example of a display window when a booklet is designated as the print target;

FIG. 27 is a view for explaining an example of a job ticket whose print range is designated to print an entire book;

FIGS. 28A to 28C are views showing an example of the print range-designated job ticket;

FIG. 31 is a view for explaining an example of "Sheet" which represents the contents of a sheet;

FIG. 33 is a view for explaining an example of print data which is generated by a printer driver and transmitted to a printer.

DETAILED DESCRIPTION OF THE PREFERRED EMBODIMENT

First Embodiment

<General Description of System>

A document processing system according to the first embodiment suited to an information processing system of the present invention will be generally described with reference to FIGS. 1 to 12. This document processing system converts a data file created by a general application into an electronic original file by an electronic original writer. A bookbinding application provides a function of editing the electronic original file. Details of the system will be explained below.

<System Configuration and Operation>

Figure 1:
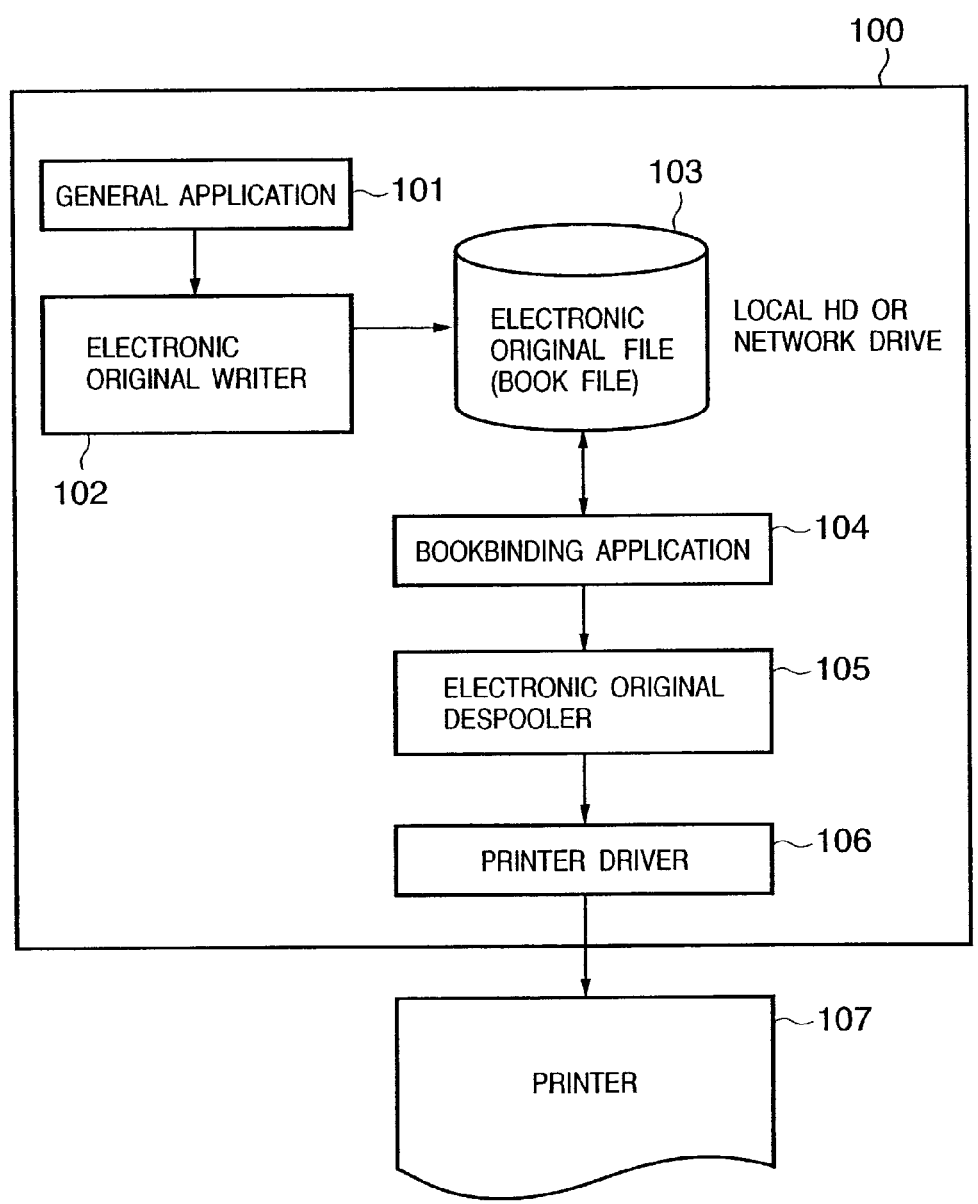
FIG. 1 is a block diagram showing a stand-alone document processing system.

FIG. 1 is a block diagram showing the software structure of the document processing system according to this embodiment. The document processing system is implemented by a digital computer 100 (to be also referred to as a host computer hereinafter) as an embodiment suited to the information processing apparatus of the present invention. A general application 101 is an application program which provides functions such as wordprocessing, spreadsheet, photo-retouch, draw, paint, presentation, and text editing. The general application 101 has a printing function corresponding to the OS. Such applications utilize a predetermined interface (generally called GDI) provided by the OS (Operating System) in printing application data such as created document data or image data. To print created data, the general application 101 transmits an output command (called a GDI function) which is determined in advance for the output module of the OS providing the interface and has an OS-dependent format. The output module which has received the output command converts the command into a format processible by an output device such as a printer, and outputs the converted command (called a DDI function). Since the format processible by the output device changes depending on the type of device, the manufacturer, and the model, a device driver is provided for each device. The OS converts a command by using the device driver, generates print data, and combines print data by JL (Job Language) to generate a print job. When the OS is Microsoft Windows, the output module is a GDI module.

An electronic original writer 102 is an improvement of the device driver, and is a software module provided to implement the document processing system. The electronic original writer 102 does not target a specific output device, and converts an output command into a format processible by a bookbinding application 104 or printer driver 106 (to be described later). The format (to be referred to as an electronic original format hereinafter) converted by the electronic original writer 102 is not particularly limited as far as each original page can be expressed by a detailed format. Of substantial standard formats, for example, the PDF format by Adobe Systems and the SVG format can be adopted as electronic original formats. When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file under the management of the bookbinding application 104. The bookbinding application 104 completes a new incomplete electronic original file generated by the electronic original writer 102 as an electronic original file having the following format. In case of necessity to definitely discriminate these files, a file created by the electronic original writer 102 will be called an electronic original file, and an electronic original file given a structure by the bookbinding application will be called a book file. If these files need not be particularly discriminated, a document file generated by an application, an electronic original file, and a book file are called document files (or document data).

As described above, the electronic original writer 102 is designated as a device driver, and the general application 101 prints the data. Application data is converted into an electronic original format in pages (to be referred to as logical pages or original pages hereinafter) defined by the application 101. The converted data is stored as an electronic original file 103 in a storage medium such as a hard disk. The hard disk may be the local drive of the computer which implements the document processing system of this embodiment, or when the computer is connected to a network, may be a drive provided on the network.

The bookbinding application 104 provides the user with a function of loading and editing the electronic original file or book file 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic original despooler 105. The electronic original despooler 105 is a program module installed into the computer together with the bookbinding application. The electronic original despooler 105 is a module used to output drawing data to a printer driver in printing a document (book file) used by the bookbinding application. The electronic original despooler 105 reads out a designated book file from the hard disk. To print each page in a format described in the book file, the electronic original despooler 105 generates an output command complying with the output module of the OS described above, and outputs the command to the output module (not shown). At this time, the printer driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

Figure 2:
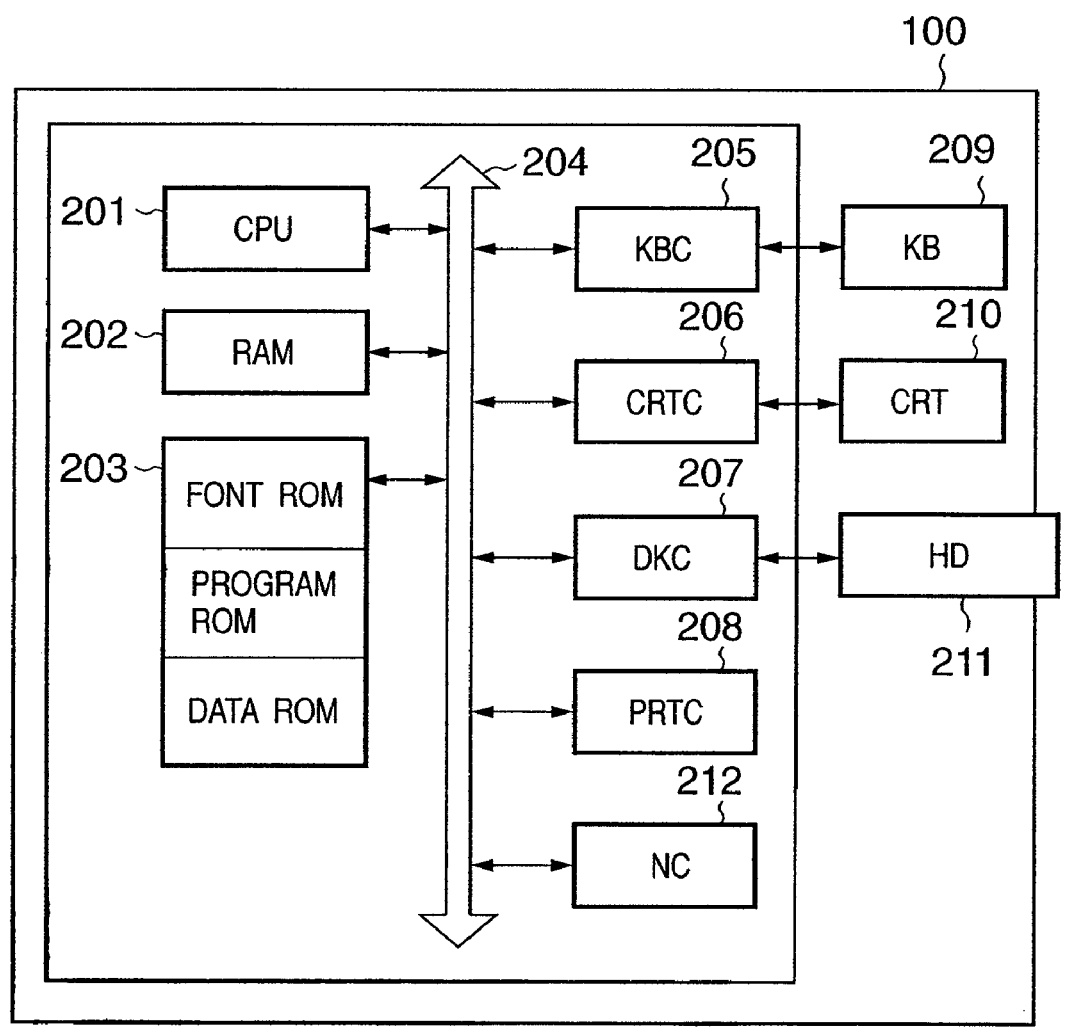
FIG. 2 is a block diagram showing a computer which implements the document processing system.

FIG. 2 is a block diagram showing the hardware of the computer 100. In FIG. 2, a CPU 201 executes a program such as an OS, general application, or bookbinding application which is stored in the program ROM of a ROM 203 or loaded from a hard disk 211 to a RAM 202, and realizes the software structure in FIG. 1 or flow chart procedures (to be described later). The RAM 202 functions as the main memory or work area of the CPU 201. A keyboard controller (KBC) 205 controls a key input from a keyboard 209 or a pointing device (not shown). A CRT controller (CRTC) 206 controls the display on a CRT display 210. A disk controller (DKC) 207 controls access to the hard disk (HD) 211 or floppy disk (FD) which stores a boot program, various applications, font data, user files, editing files (to be described later), and the like. A PRTC 208 controls signal exchange with the connected printer 107. An NC 212 is connected to a network, and executes communication control processing with another device connected to the network.

<Electronic Original Data Format>

Before the bookbinding application 104 is described in detail, the book file data format will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may include a plurality of chapters, and one chapter may include a plurality of pages.

Figure 3A:
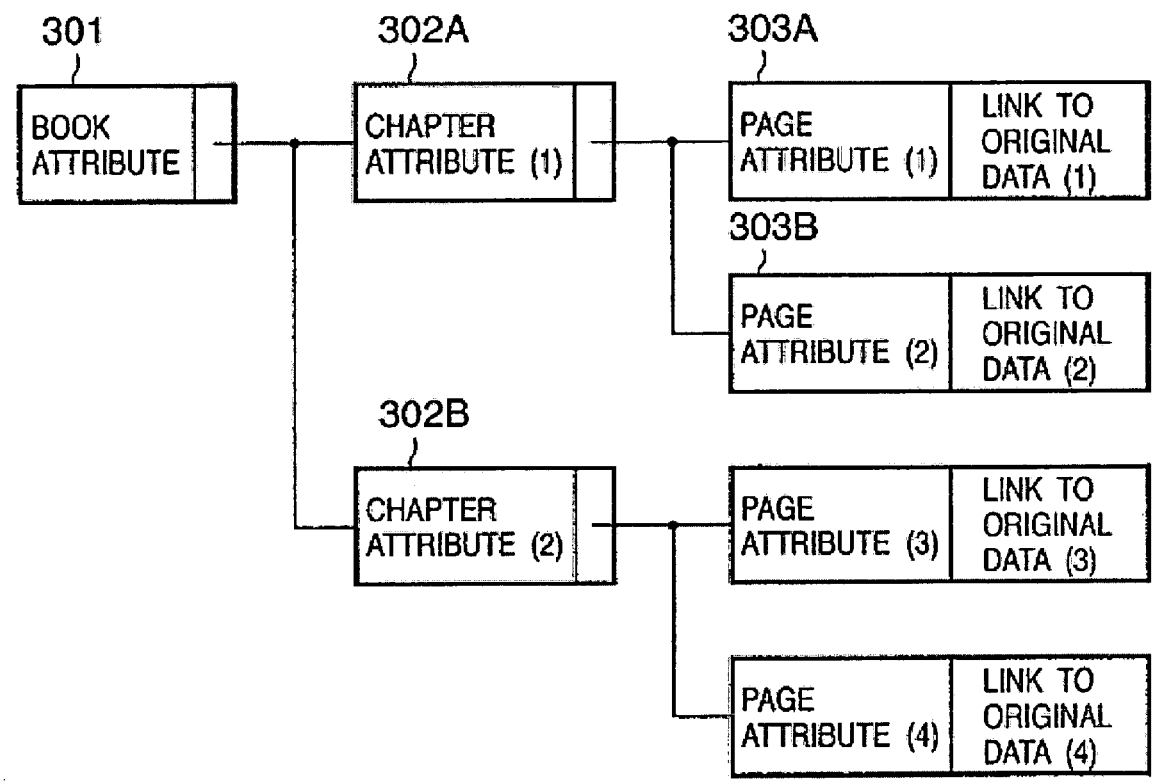
FIGS. 3A and 3B are views showing an example of a book file structure.

FIG. 3A is a block diagram schematically showing an example of the book file format. In the book file of this example, a book, chapter, and page are represented by corresponding nodes. One book file includes one book. The book and chapter are a concept for defining a book structure, and contain, as entities, defined attribute values and links to lower layers. The page has, as an entity, data of each page output from an application program. In addition to an attribute value, the page contains the entity of an original page (original page data) and a link to each original page data. In some cases, a print page to be output onto a paper medium or the like includes a plurality of original pages. This structure is displayed not by a link but by an attribute in the book, chapter, or page layer.

Figure 3B:
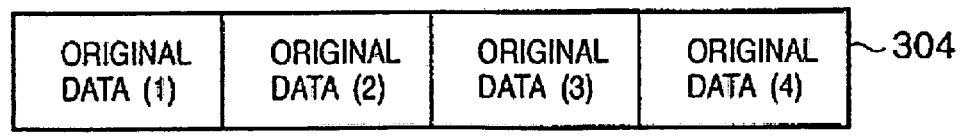

In FIGS. 3A and 3B, a book 301 defines a book attribute, and is linked to two chapters 302A and 302B. These links display that the chapters 302A and 302B are included in the book 301. The chapter 302A is linked to pages 303A and 303B, which represents that the chapter 302A includes these pages. The pages 303A and 303B define attribute values, and contain links to original page data (1) and (2) serving as entities. These links represent data (1) and (2) of original page data 304 shown in FIG. 3B, and display that the entities of the pages 303A and 303B are original page data (1) and (2).

FIGS. 4A and 4B show a list of book attributes. As for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. Each item shown in FIGS. 4A and 4B does not always correspond to one concrete item, but may contain a plurality of relevant items.

FIG. 5 shows a list of chapter attributes, and FIG. 6 shows a list of page attributes. The relationship between chapter attributes and page attributes is the same as that between book attributes and lower layer attributes.

Items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a deckle-edged index sheet separately prepared in a printing apparatus for chaptering, and designation of contents to be printed on the index (deckle-edged) sheet. This attribute becomes effective when a printing apparatus to be used is equipped with an inserter having an inserting function of inserting a paper sheet prepared separately from a print paper sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, a continuous chapter is not printed on one paper sheet if "the use of a new paper sheet" is designated, but may be printed on the upper and lower surfaces of one paper sheet if "the use of a new print page" is designated.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper direction, N-up printing designation, enlargement/reduction, and discharge method. The N-up printing designation attribute is an item for designating the number of original pages included in one print page. Layouts which can be designated are 1×1, 1×2, 2×2, 3×3, 4×4, and the like. The discharge method attribute is an item for designating whether to staple discharged paper sheets. The effectiveness of this item depends on whether the printing apparatus has a staple function.

Items unique to the page attribute are a page rotation attribute, zoom, layout designation, annotation, and page division. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different in the book. The book can set the contents of the watermark and header/footer, and designate how to print a watermark or header/footer throughout the book. To the contrary, the chapter and page can designate whether to print a watermark or header/footer set by the book on the chapter or page.

<Book File Generation Procedures>

Figure 7:
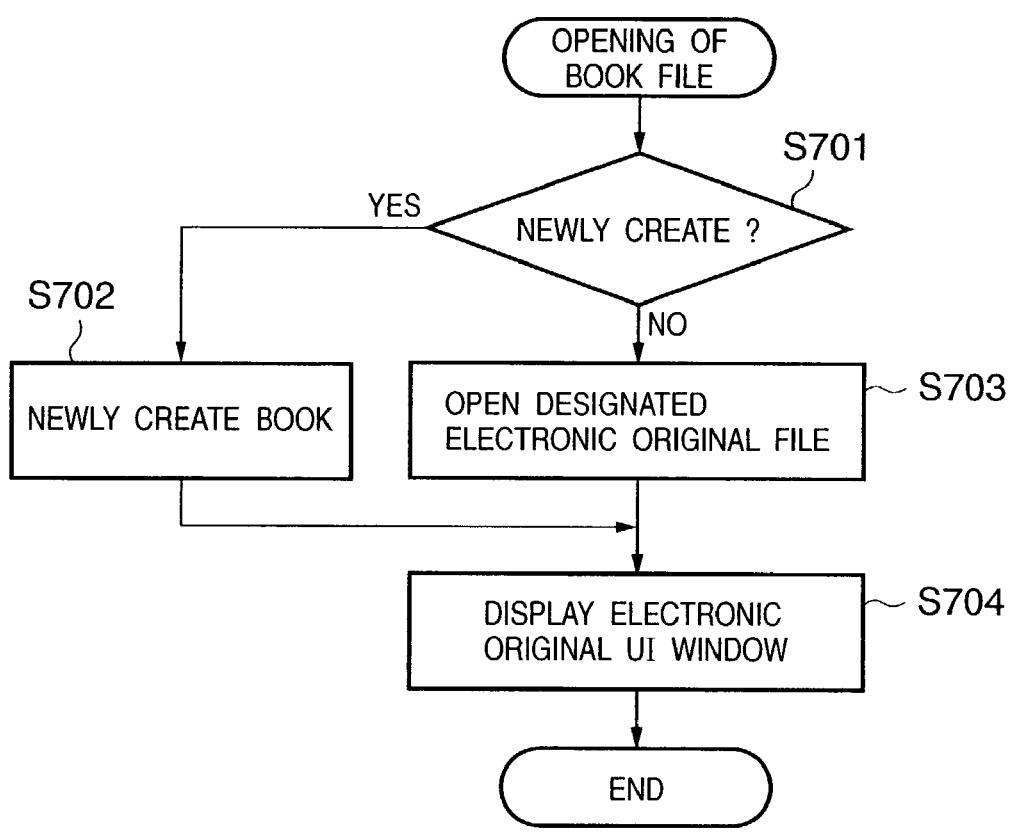
FIG. 7 is a flow chart showing procedures of opening a book file.

The book file has the above-described structure and contents. Procedures of creating a book file by the bookbinding application 104 and electronic original writer 102 will be explained. Creation of a book file is realized as part of book file editing operation by the bookbinding application 104. FIG. 7 shows procedures when the bookbinding application 104 opens a book file.

Figure 11:
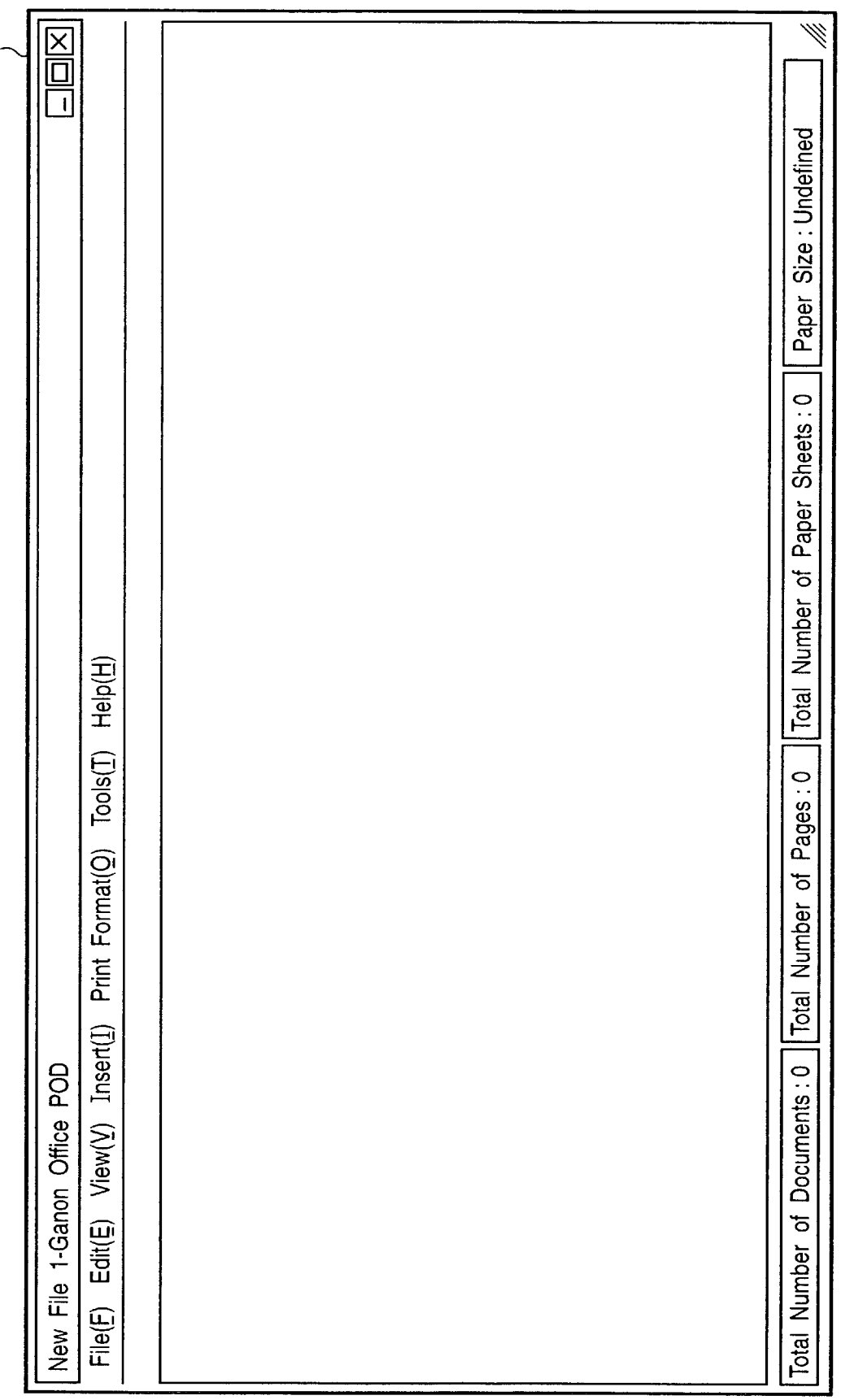
FIG. 11 is a view showing an example of a user interface window when a new book file is opened.

Whether a book file to be opened is one to be newly created or an existing one is checked (step S701). If YES in step S701, a book file including no chapter is newly created (step S702). In the example shown in FIGS. 3A and 3B, the newly created book file is a book node which has only the book node 301 without any link to a chapter node. As the book attribute, a set of attributes prepared in advance for creation of a new book file are applied. Then, a UI (User Interface) window for editing the new book file is displayed (step S704). FIG. 11 shows an example of the UI window when a book file is newly created. In this case, a UI window 1100 does not display any information because the book file does not have any substantial content.

Figure 10:
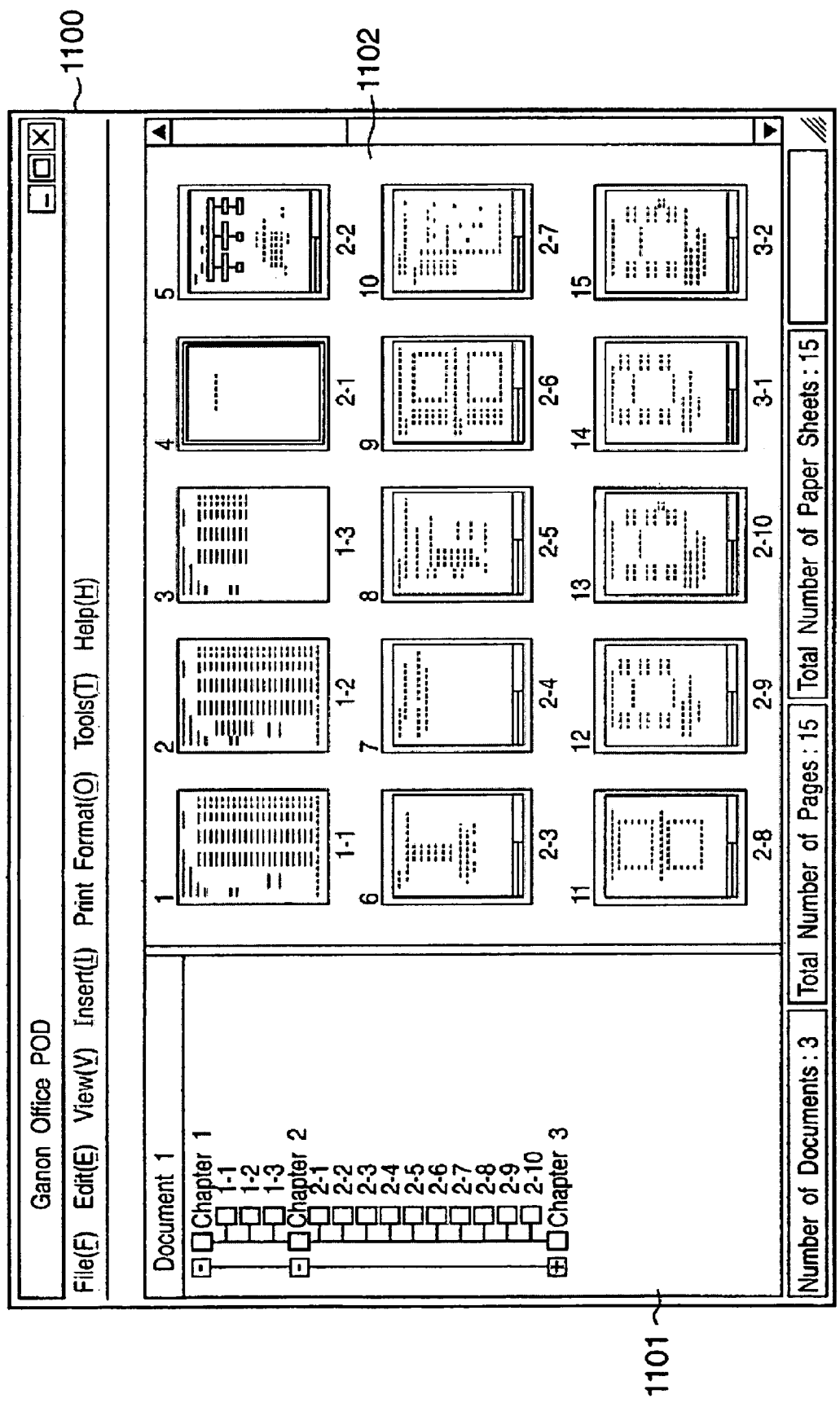
FIG. 10 is a view showing an example of a user interface window when an existing book file is opened.

If NO in step S701, a designated book file is opened (step S703), and a UI (User Interface) window is displayed in accordance with the structure, attribute, and contents of the book file. FIG. 10 shows an example of the UI window. The U1 window 1100 has a tree portion 1101 representing a book structure, and a preview portion 1102 displaying a state to be printed. The tree portion 1101 displays chapters included in the book and pages included in each chapter by a tree structure as shown in FIG. 3A. Pages displayed at the tree portion 1101 are original pages. The preview portion 1102 displays reduced print page contents. The display order reflects the book structure.

Figure 8:
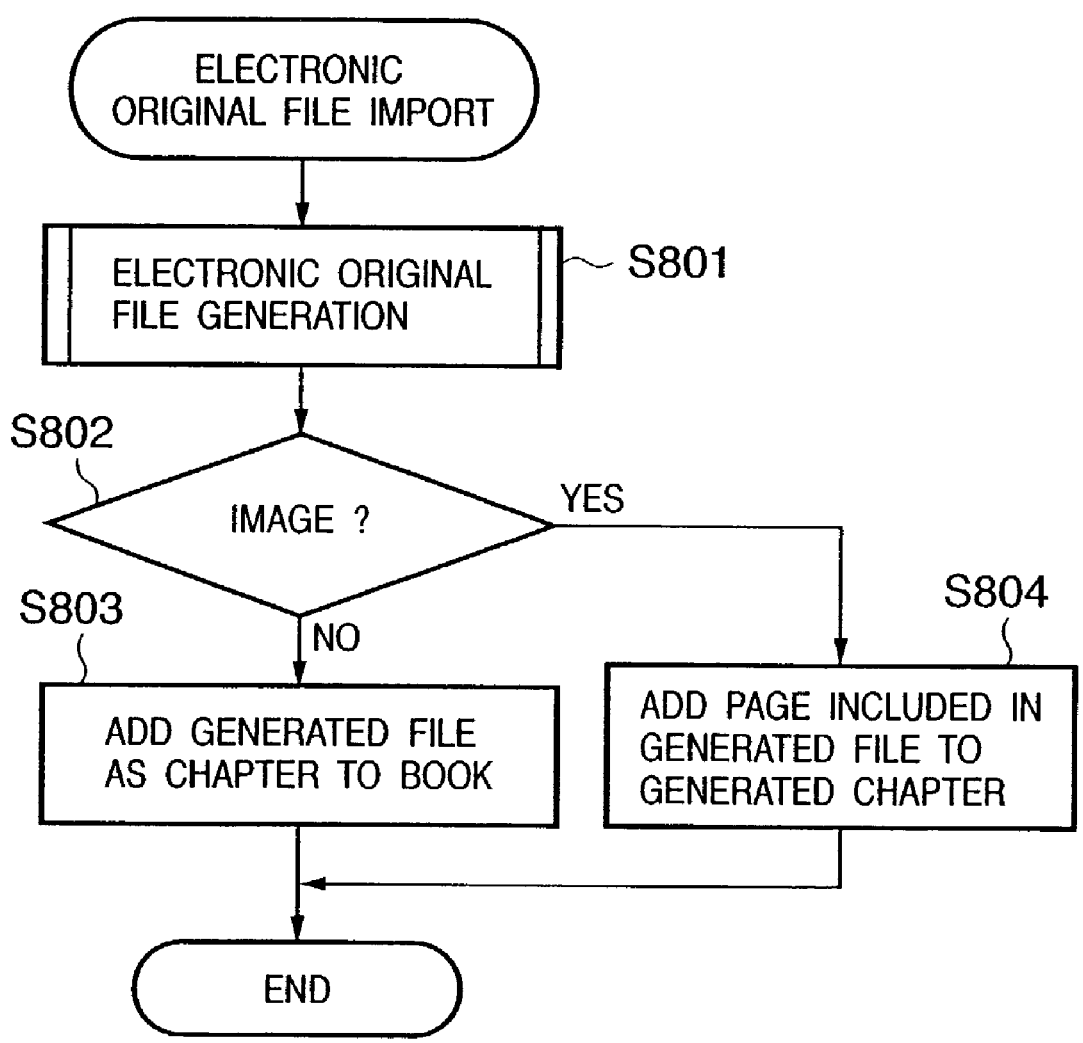
FIG. 8 is a flow chart showing procedures of importing an electronic original file into a book file.

Application data converted into an electronic original file by the electronic original writer can be added as a new chapter to the open book file. This function is called an electronic original import function. An electronic original is imported to the book file newly created by the procedures of FIG. 7, thereby giving an entity to the book file. This function is activated by drag-and-drop operation of application data to the window of FIG. 10. FIG. 8 shows electronic original import procedures.

An application program which has generated designated application data is activated. The electronic original writer 102 is designated as a device driver, and prints out application data to convert it into electronic original data (step S801). After conversion, whether the converted data is image data is checked (step S802). This determination can be achieved based on the file extension of the application under the Windows OS. For example, an extension "bmp" represents Windows bitmap data; "jpg", jpeg-compressed image data; and "tiff", tiff-format image data. If YES in step S802, processing in S801 can be skipped because an electronic original file can be directly generated from image data without activating an application in S801.

If NO in step S802, the electronic original file generated in step S801 is added as a new chapter to the book of a currently open book file (step S803). As for the chapter attribute, an attribute common to a book attribute is set to a book attribute value, and a different attribute is set to a default value prepared in advance.

If YES in step S802, no new chapter is added in principle, and each original page included in the electronic original file generated in step S801 is added to a designated chapter (step S804). For a file in which a book file is newly created, a new chapter is created, and each page of the electronic original file is added as a page belonging to the chapter. As for the page attribute, an attribute common to an upper layer attribute is given the attribute value of the upper layer attribute, and an attribute which is defined in application data and inherited to the electronic original file is given a value defined in the application data. For example, when N-up designation is defined in application data, the page inherits this attribute value. In this way, a new book file is created, or a new chapter is added.

Figure 9:
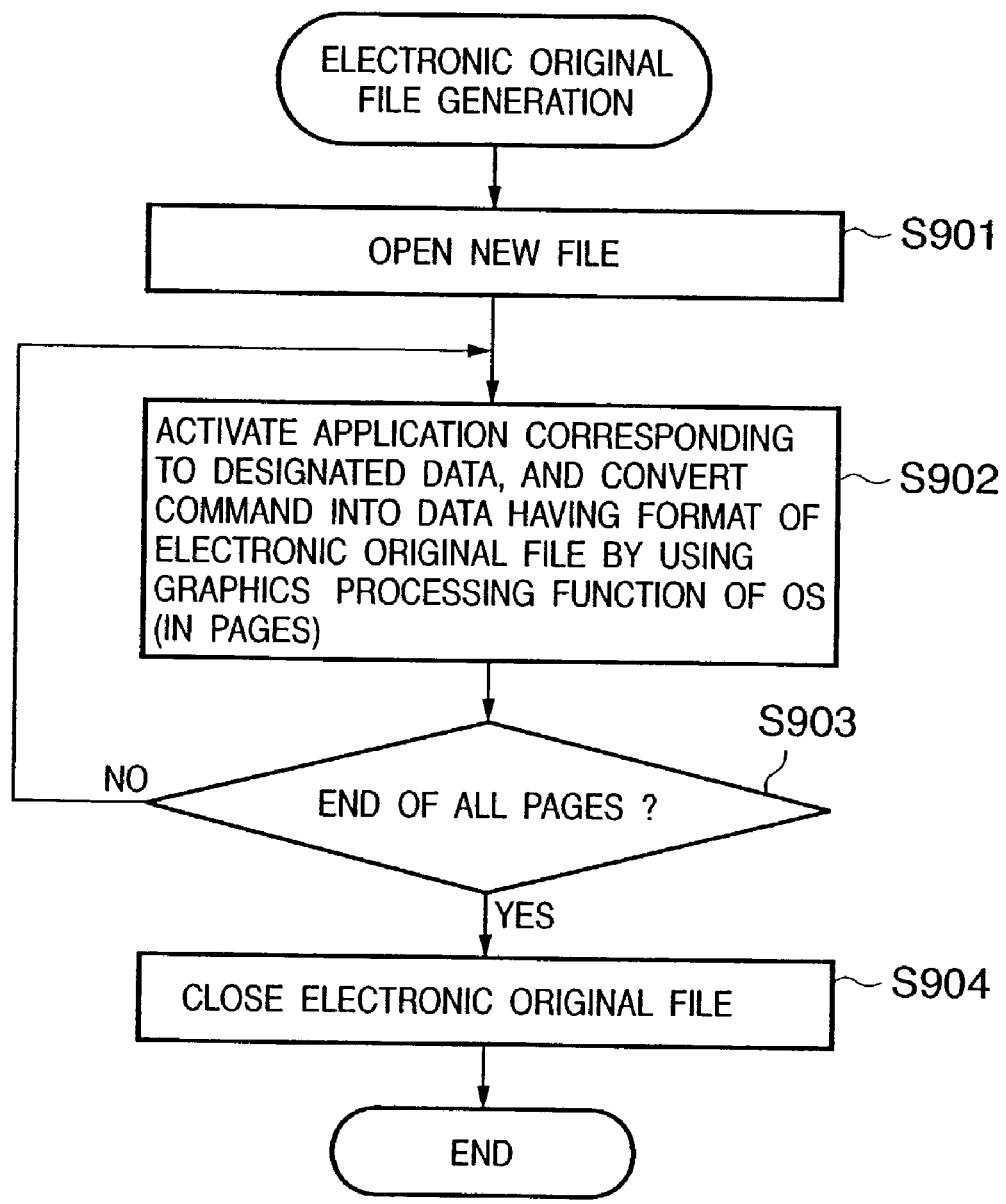
FIG. 9 is a flow chart showing procedures of converting application data into an electronic original file.

FIG. 9 is a flow chart showing procedures of generating an electronic original file by the electronic original writer 102 in step S801 of FIG. 8. A new electronic original file is created and opened (step S901). An application corresponding to designated application data is activated. The electronic original writer is set as a device driver to transmit an output command to the output module of the OS. The output module converts the received output command into data of the electronic original format by the electronic original writer, and outputs the converted data (step S902). The output destination is the electronic original file opened in step S901. Whether all designated data have been converted is checked (step S903), and if YES in step S903, the electronic original file is closed (step S904). The electronic original file generated by the electronic original writer 102 is a file containing original page data entities shown in FIG. 3B.

<Editing of Book File>

As described above, a book file can be created from application data. The generated book file allows editing a chapter and page as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of an original page, and insertion of a slip sheet and index sheet. By these operations, operation results are reflected on attributes shown in FIGS. 4 and 5 or on a book file structure. For example, a blank page is inserted into a designated portion by an operation of newly adding a blank page. The blank page is processed as an original page. If the layout of an original page is changed, the change contents are reflected on attributes such as the printing method, N-up printing, front/back cover, index sheet, slip sheet, and chaptering.

<Output of Book File>

The ultimate goal of a book file created and edited in the above manner is to print it out. The user selects a file menu from the UI window 1100 of the bookbinding application shown in FIG. 10, and selects printing from this menu. Then, the book file is printed out from a designated output device. At this time, the bookbinding application 104 creates a job ticket from a currently open book file, and transfers the job ticket to the electronic original despooler 105. The electronic original despooler 105 converts the job ticket into an OS output command, e.g., a Windows GDI command, and transmits the command to an output module, e.g., GDI. The output module generates a command complying with a device by a designated printer driver 106, and transmits the command to the device.

The job ticket is data with a structure whose minimum unit is an original page. The structure of the job ticket defines the layout of an original page on paper. One job ticket is issued for one job. A document node is set at the top of the structure, and defines the attribute of the whole document such as double-sided printing/single-sided printing. A paper node belongs to the document node, and contains attributes such as the identifier of paper for use and designation of a feed port in the printer. A node for a sheet printed by the paper belongs to each paper node. One sheet corresponds to one paper sheet. A print page (physical page) belongs to each sheet. One physical page belongs to one sheet for single-sided printing, and two physical pages belong to one sheet for double-sided printing. An original page to be laid out on a physical page belongs to the physical page. The physical page attribute contains an original page layout.

The electronic original despooler 105 converts the job ticket into an output command to the output module.

<Another System Configuration>

The document processing system of this embodiment has generally been described. This system is of stand-alone type. A server-client system as an extension of the stand-alone system also creates and edits a book file by almost the same arrangement and procedures. A book file and print processing are managed by the server.

Figure 12:
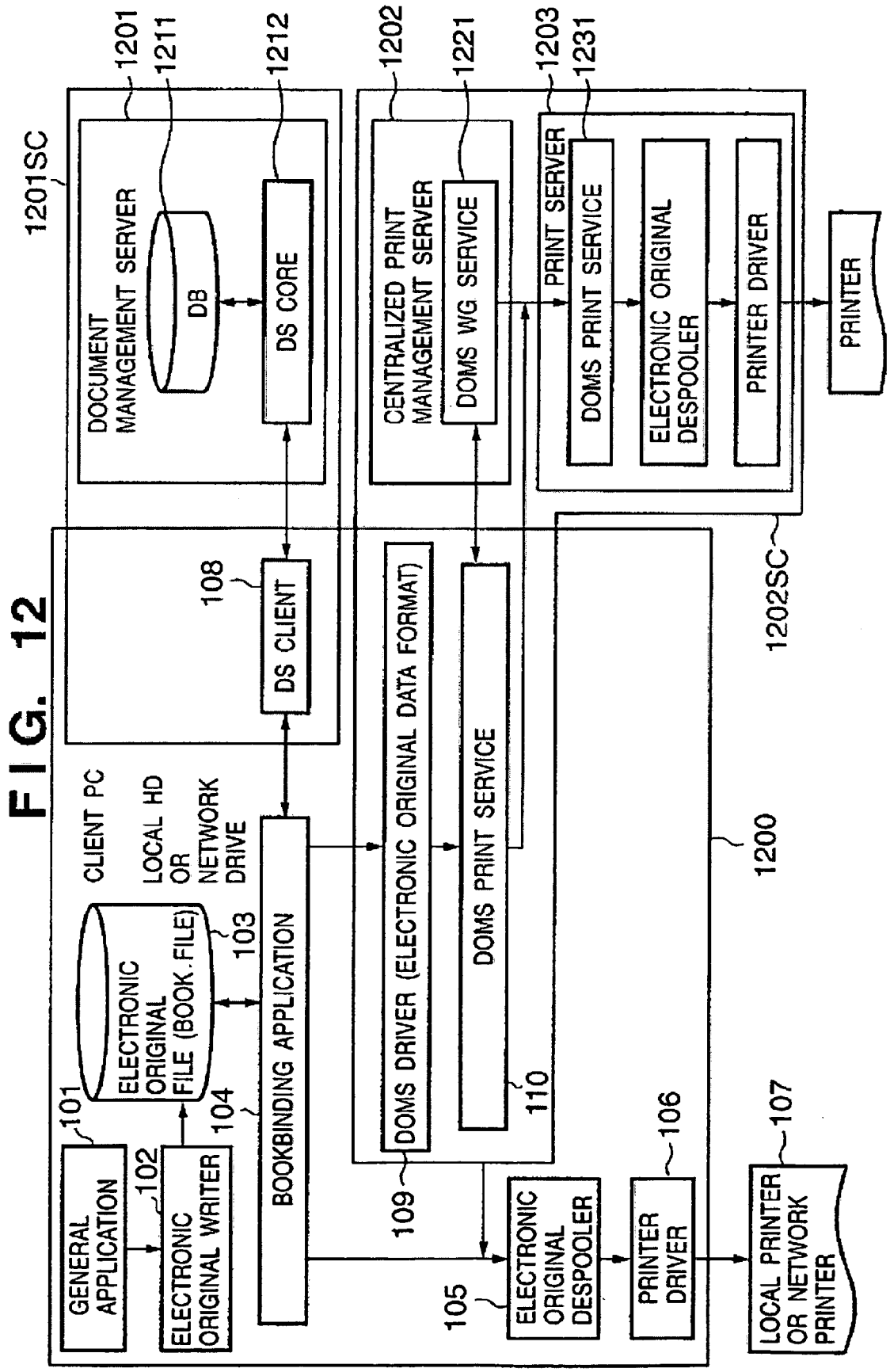
FIG. 12 is a block diagram showing a client-server document processing system.

FIG. 12 is a block diagram showing the arrangement of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, centralized print management server 1202, and print server 1203. These servers are generally connected to the client document processing system via a network. When the servers also function as clients, they are connected by interprocess communication which simulates communication between networks. The document management server 1201 and centralized print management server 1202 are connected to the client in FIG. 12, but only either one may exist on the network. If the connected server is the document management server, a document management server-client system 1201SC including a client module is added to the stand-alone document management system. If the connected server is the centralized print management server 1202, a print management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client module 108 and a DS core 1212.

The centralized print management server 1202 manages printing of a book file stored in the client document processing system 1200 or document management server 1201. A print request from the client is transmitted to a DOMS WG server module 1221 of the centralized print management server 1202 via the DOMS driver 109 and DOMS print service module 110. To print a book file by the printer of the client, the centralized print management server 1202 transfers electronic original data to the electronic original despooler 105 via the DOMS print service module 110 of the client. To print a book file by the print server 1203, the centralized print management server 1202 transmits electronic original data to a DOMS print service module 1231 of the print server 1203. For example, the centralized print management server executes security check on the qualification of a user who has issued a print request for a saved book file, or saves the print processing log. In this fashion, the document processing system can be implemented as both a stand-alone system and client-server system.

<Print Setting UI and Procedures>

When the above-described document processing system is to print a document file, a target print range can be set in a unit corresponding to the settings of the document file printing method. In this embodiment, the print range can be designated in the bookbinding unit (bundles) when bookbinding printing is designated as the printing method, or in chapters, print pages, or original pages when single- or double-sided printing is designated. The whole document can be designated regardless of the printing method.

Figure 13:
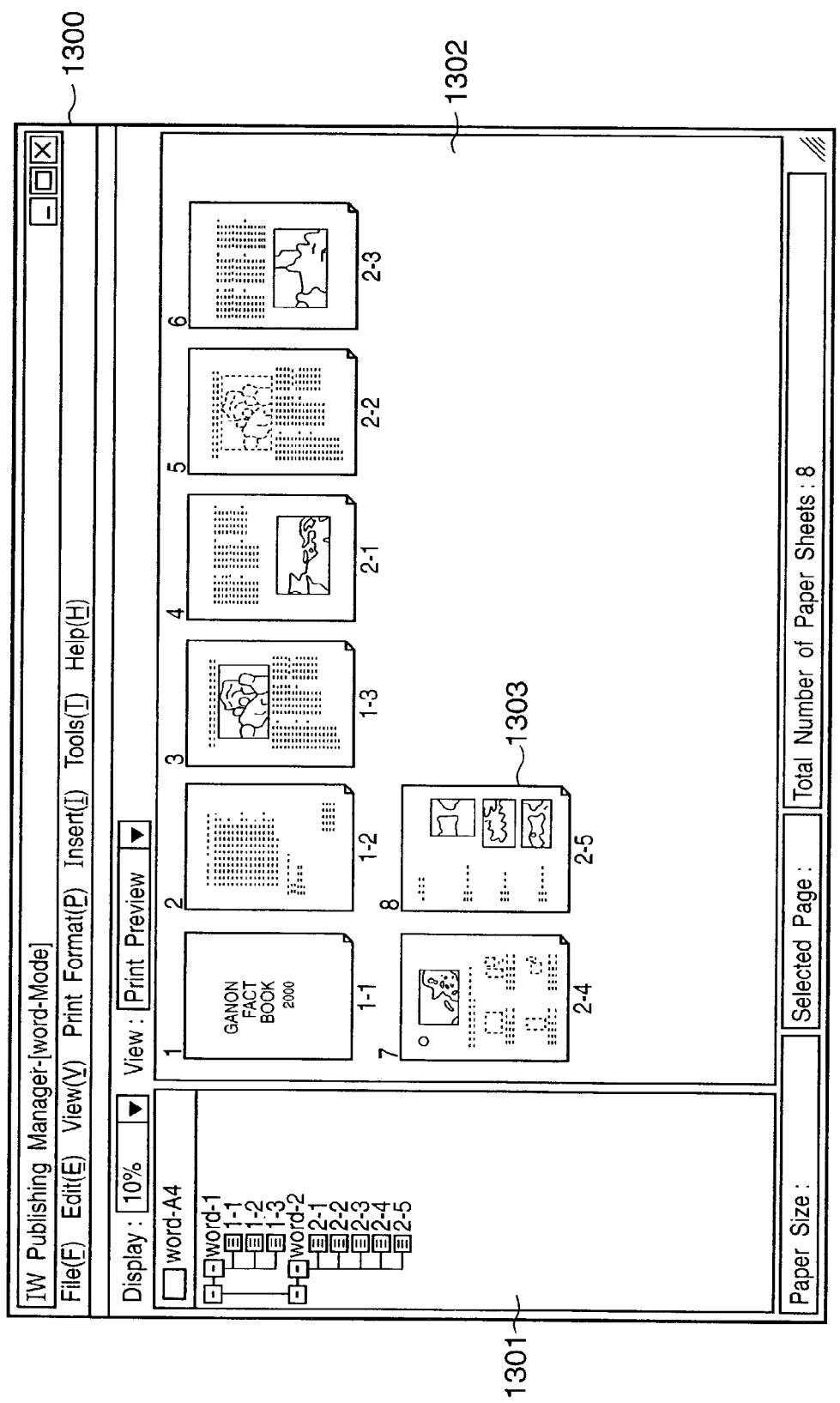
FIG. 13 is a view showing an example of a preview window in single-sided 1-up printing designation.
Figure 14:
FIG. 14 is a view showing an example of a printing method (single-sided printing) designation window.

FIG. 13 shows an example of the UI window of a book-binding application when a book file in which single-sided printing is designated as the printing method and the arrangement of one original page on one print page is designated as the layout is opened. In this example, a book file "WORD-A4" is opened. This file is made up of chapters word-1 and word-2. Single-sided printing is designated by selecting detailed book setting from a "print format" menu on a UI window 1300 and selecting a radio button "single-sided printing" in a printing method designation column 1401 on a displayed window 1400 in FIG. 14. A layout in which N original pages are laid out on one print page is called N-up. The example of FIG. 13 shows a 1-up layout.

On the UI window 1300 of FIG. 13, a tree portion 1301 displays the structure of the currently open book file. A preview portion 1302 exhibits a preview display representing a state to be printed. The preview display has three modes: a print view mode where a reduced print page is displayed, a simple view mode where only the layout of a print page is displayed, and an original view mode where the contents of an original page are displayed. In FIG. 13, the print view mode is selected. The preview portion 1302 displays page images 1303 representing print pages. An original page number is displayed below each page image 1303, and a sheet number representing the number of print paper sheets is displayed at the upper right position of the page image 1303. When single-sided printing is designated as the printing method and a 1-up layout is designated as the layout, one sheet (paper) corresponds to one original page. In FIG. 13, respective print pages are assigned sheet numbers and the page numbers of original pages.

Figure 15:
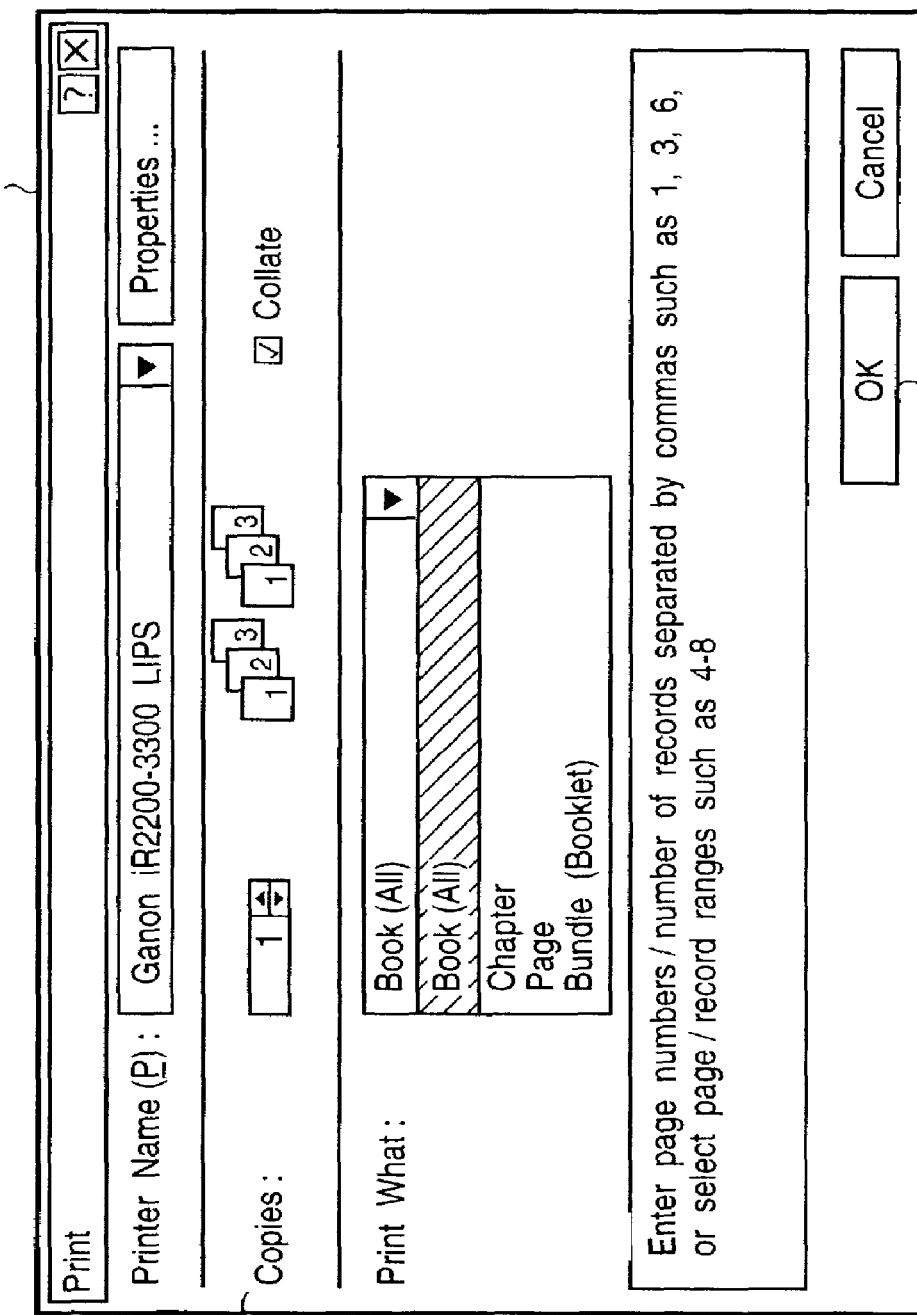
FIG. 15 is a view showing an example of a window for designating a print target.

To perform print setting for this book file, the user selects a file menu from the window 1300, and designates "print setting" on the file menu. Then, a print setting window 1500 in FIG. 15 is displayed. The print setting window includes a "number of copies" column 1501 and print target column 1502. The "number of copies" column 1501 can be designated independently of the printing method. In the print target column 1502, items which can be designated change depending on the settings of the printing method. FIG. 15 shows an example when single- or double-sided printing is designated as the printing method. In this case, as shown in FIG. 15, "book (all)" for printing the entire book file, "chapter" for printing a designated chapter, "page" for printing a designated page, and "bundle (booklet)" serving as a bookbinding unit designated by bookbinding printing can be designated as the print target. Designation of "bundle (booklet)" is effective only when bookbinding printing is designated as the printing method. "Bundle (booklet)" may be an item selectable only when bookbinding printing is designated.

(1) Designation of Entire Range

If "book (all)" is designated in the print target column 1502, the user clicks on an OK button 1503 after designation because he/she need not designate the range. Then, print processing corresponding to settings starts. Print processing in this embodiment corresponds to not print processing by the printer, but processing of causing the electronic original despooler by the bookbinding application 104 to generate drawing data, and processing of causing a printer driver via the OS to generate print data (print job).

(2) Designation by Chapter Number

Figure 16:
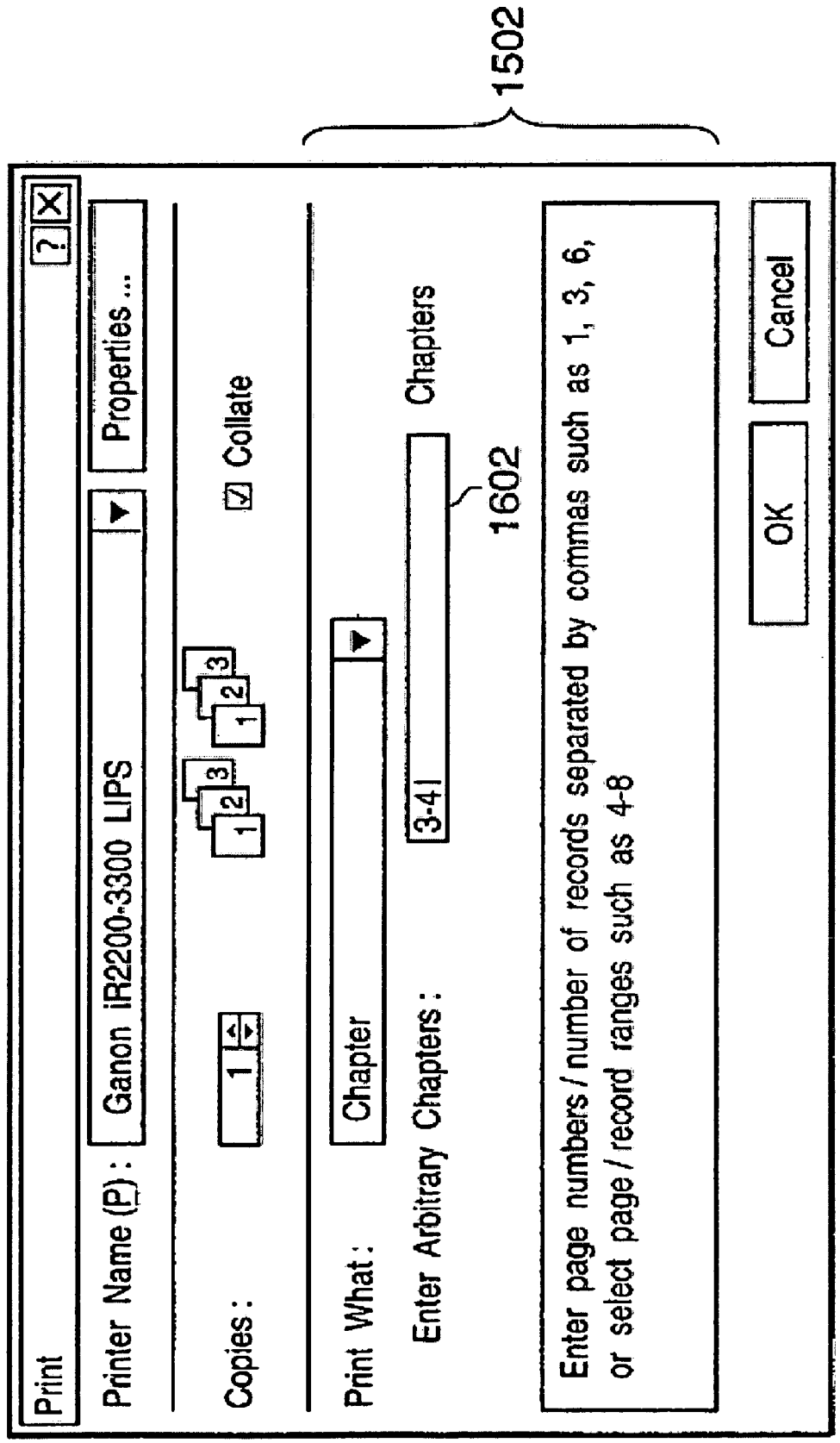
FIG. 16 is a view showing an example of a display window when a chapter is designated as the print target.

When "chapter" is designated, a chapter designation column 1602 is displayed in the print target column 1502, and allows designating a chapter to be printed, as shown in FIG. 16. For single-sided 1-up printing, a chapter break coincides with a page break, as represented by the preview portion of FIG. 13. The bookbinding application creates a job ticket including a sheet corresponding to the designated chapter, and transfers the job ticket to the electronic original despooler 105 in FIG. 1.

In double-sided printing designated as the printing method, a chapter break does not always coincide with a sheet break. FIG. 19 is a view showing an example of a preview window when double-sided 1-up printing is designated for the same book file as that in FIG. 18. Because of double-sided printing, two original pages are printed on the two surfaces of one sheet. A page number is displayed every original page, similar to FIG. 18, but a sheet number is assigned every three pages. A preview portion 1902 displays slightly shifted print pages on the two surfaces of a sheet so as to visually confirm double-sided printing. Also in this case, a UI window for designating a print range by a chapter number is identical to the window in FIG. 16. In some cases, the first or last sheet of a designated range may overlap two chapters. In the example of FIG. 19, the third page of the first chapter and the first page of the second chapter are printed on sheet 2. In this case, all pages on a sheet including a designated chapter are subjected to printing. That is, when the second chapter is designated as the print target in FIG. 19, both page 1-3 and page 2-1 are printed. This is because partial printing is often executed for partial replacement.

Figure 21:
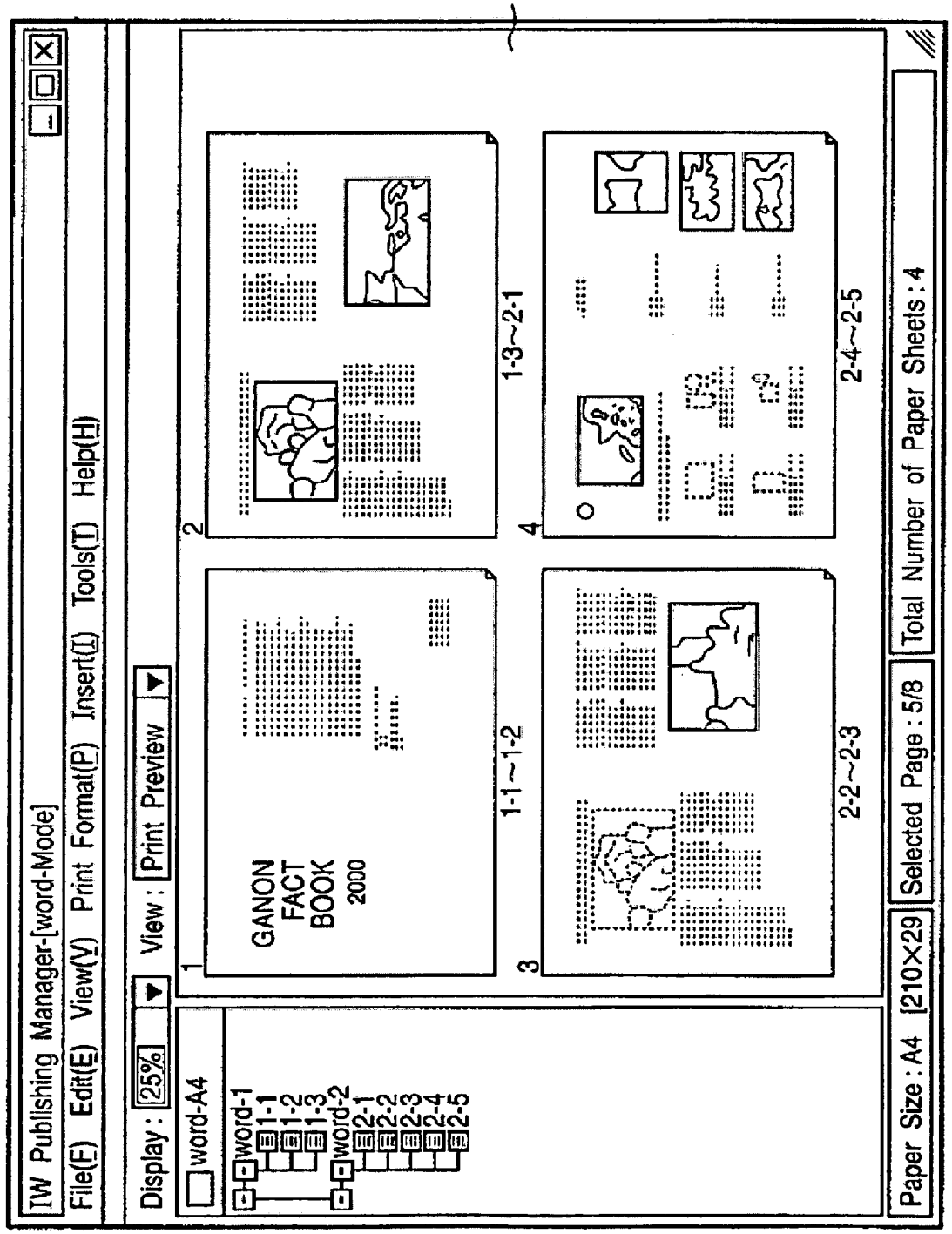
FIG. 21 is a view showing an example of a preview window in single-sided 2-up printing designation.

This also applies to a book file with N-up designation for laying out a plurality of original pages on one print page. FIG. 21 shows an example of a UI window when 2-up designation is set for the same book file as that in FIG. 19. A preview portion 2102 displays as the print page of sheet 2 an image on which the third page of the first chapter and the first page of the second chapter are laid out. When the second chapter is designated as the print target, both page 1-3 and page 2-1 are printed.

Also when bookbinding printing is designated as the printing method and a print range is designated by a chapter number, all pages on a sheet including a designated chapter are subjected to printing. FIG. 22 shows a window for designating bookbinding printing. A window 2201 in FIG. 22 is displayed the same procedures as those of the window in FIG. 14. Since bookbinding printing is designated in a printing method column 2202, items which can be designated are an opening direction 2203 and a "number of paper sheets" 2204 serving as a bookbinding printing unit (bundle). In this case, the bookbinding unit is two paper sheets. No chaptering is designated, and no page break or paper change is done between successive chapters.

The bookbinding unit is a booklet obtained by superimposing a designated number of paper sheets and folding them into two. The booklet is bound into one book. The layout is formally the same as the double-sided 2-up layout. Original pages are laid out so as to make the facing order coincide with the original page order after bookbinding.

Figure 23:
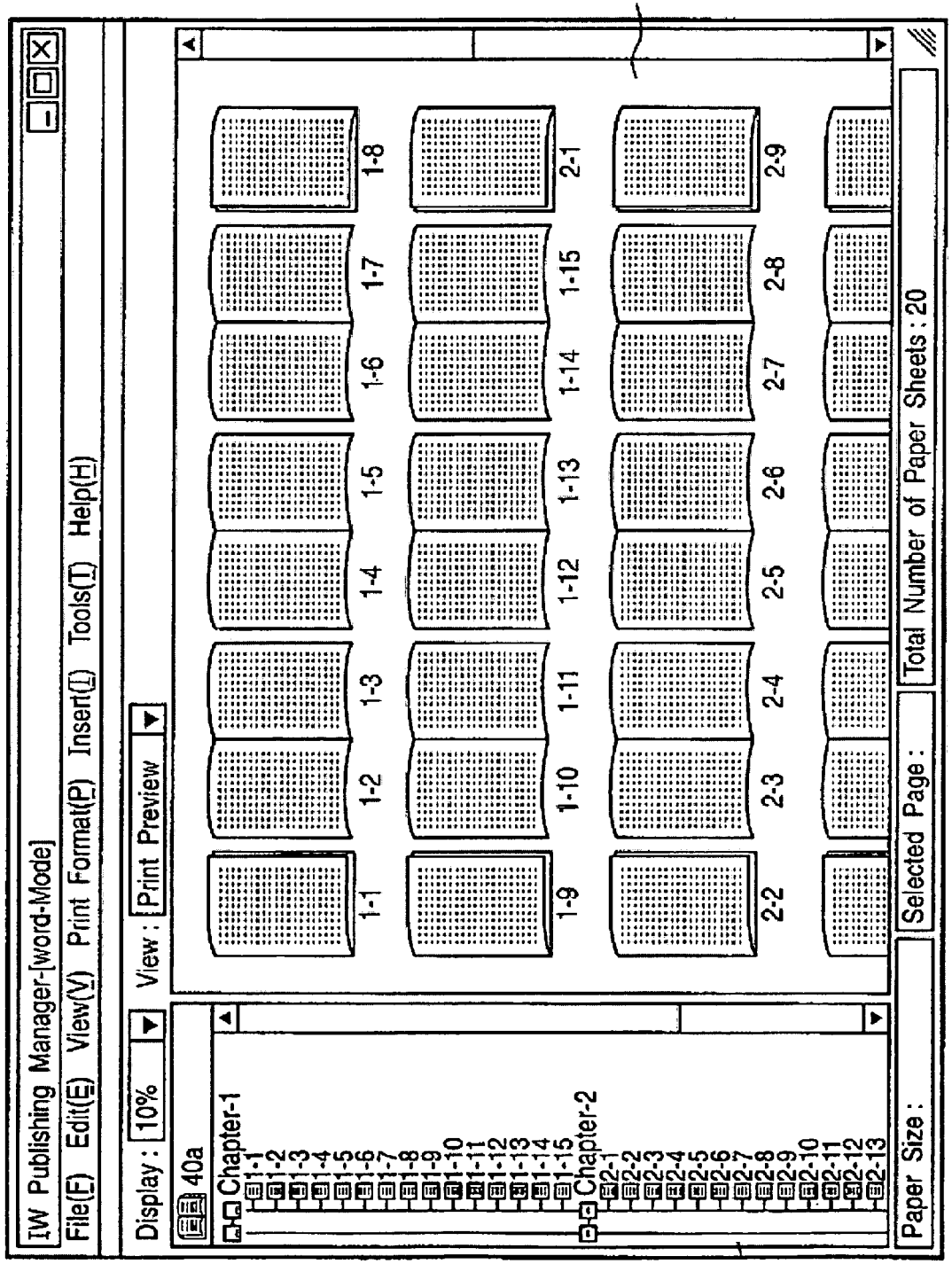
FIG. 23 is a view showing an example of a preview window in bookbinding printing designation.

FIG. 23 shows a UI window when the bookbinding application opens a book file in bookbinding printing designation. The open book file includes the first chapter "chapter 1" and the second chapter "chapter 2". The first chapter includes 15 original pages, and the second chapter includes at least 14 original pages. A preview portion 2302 displays the preview images of the original pages of one bundle on one row in the facing order. The display format also complies with the facing format. In FIG. 23, the bookbinding unit is two paper sheets, and each booklet is made up of two sheets. Since two original pages are laid out on one surface of each sheet, one booklet has eight original pages.

In bookbinding printing, a target print range is designated by a chapter number, and then all booklets including the designated chapter are printed. In the example of FIG. 23, for the first booklet, pages 1-4 and 1-5 are printed on the upper surface of an inner sheet, and pages 1-3 and 1-6 are printed on the lower surface. Pages 1-2 and 1-7 are printed on the upper surface of an outer sheet, and pages 1-1 and 1-8 are printed on the lower surface. For the second booklet, pages 1-12 and 1-13 are printed on the upper surface of an inner sheet, and pages 1-11 and 1-14 are printed on the lower surface. Pages 1-10 and 1-15 are printed on the upper surface of an outer sheet, and pages 1-9 and 2-1 are printed on the lower surface. When the second chapter is designated as a print range, the first page of the second chapter is included in the second booklet. Thus, all booklets including the second chapter such as the second, third, and fourth booklets are printed.

In this manner, when a chapter number is designated, all print units including the designated chapter, i.e., all sheets including the designated chapter in single- or double-sided printing, or all booklets including the designated chapter in bookbinding printing are set as a print range and printed.

(3) Designation by Page Number

Figure 17:
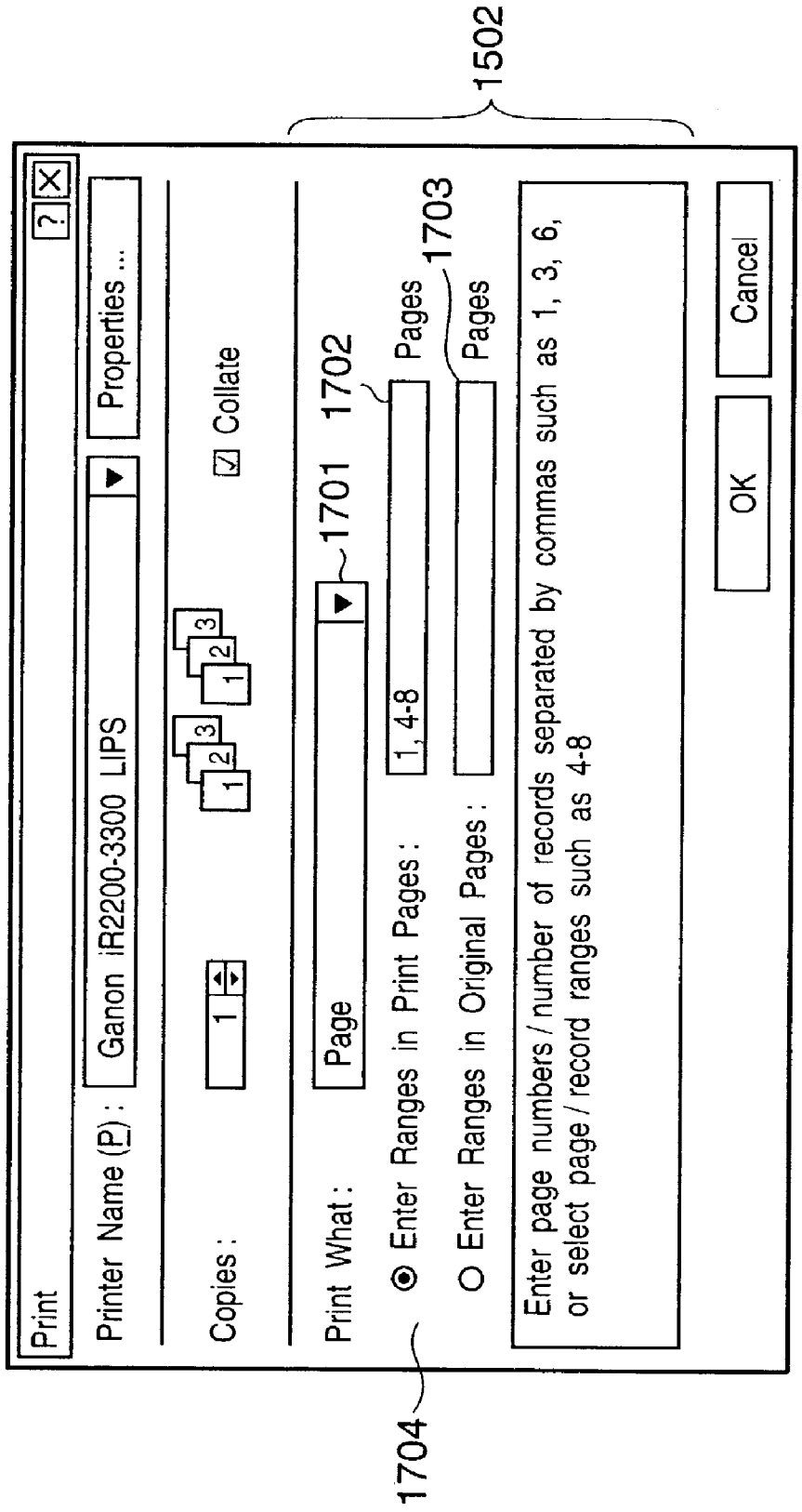
FIG. 17 is a view showing an example of a display window when a print page is designated as the print target.
Figure 18:
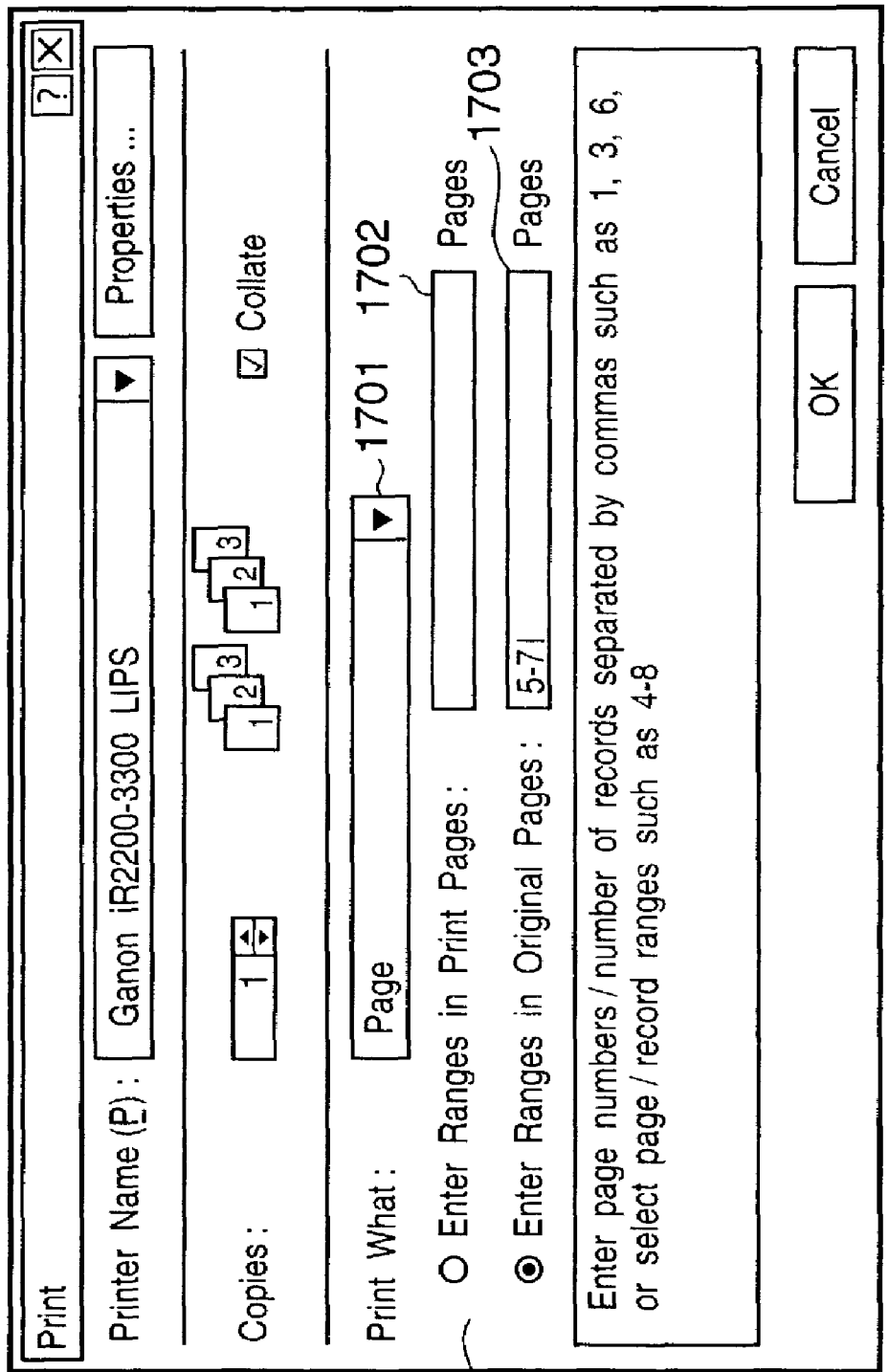
FIG. 18 is a view showing an example of a display window when an original page is designated as the print target.
Figure 19:
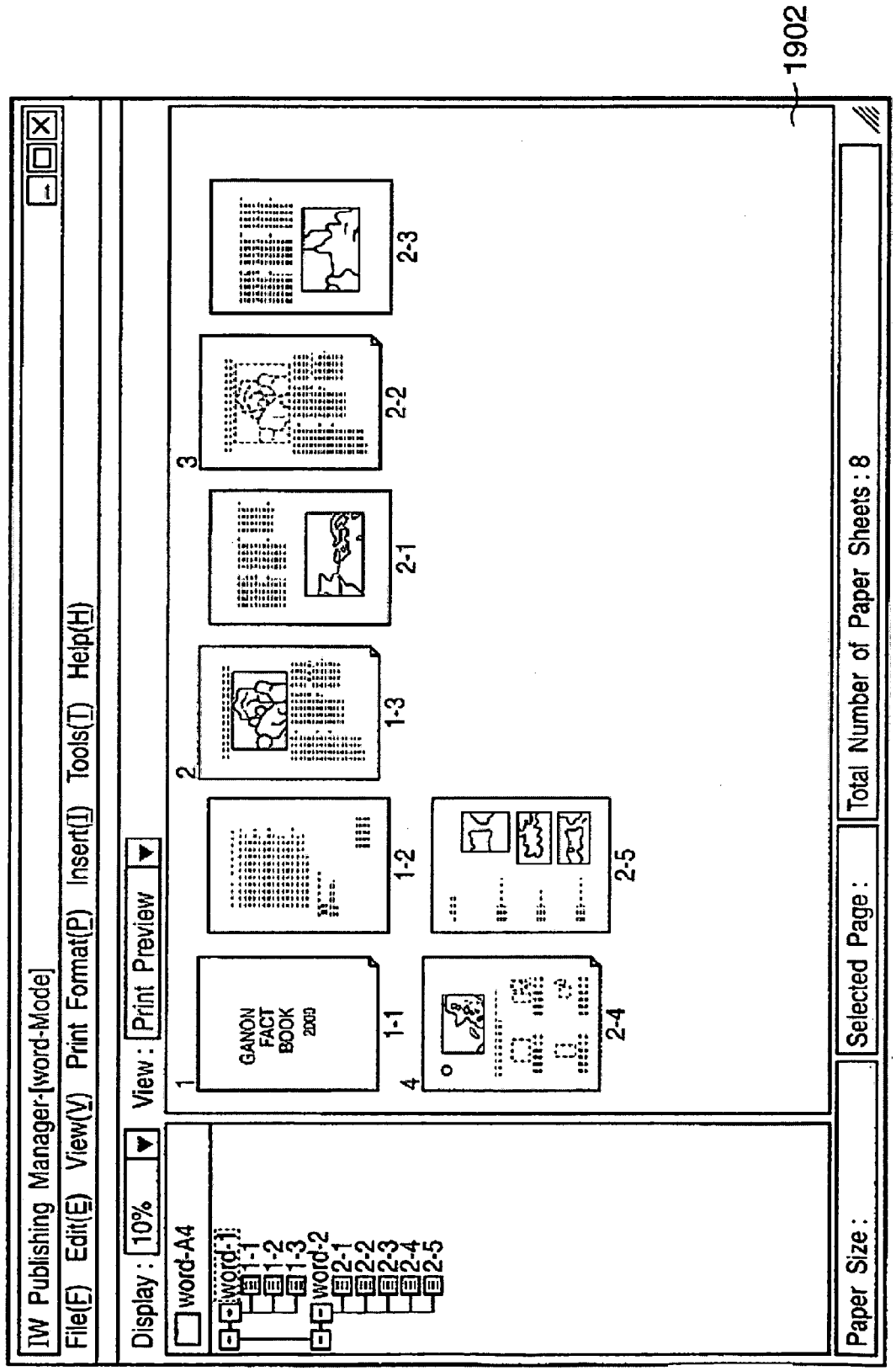
FIG. 19 is a view showing an example of a preview window in double-sided 1-up printing designation.
Figure 20:
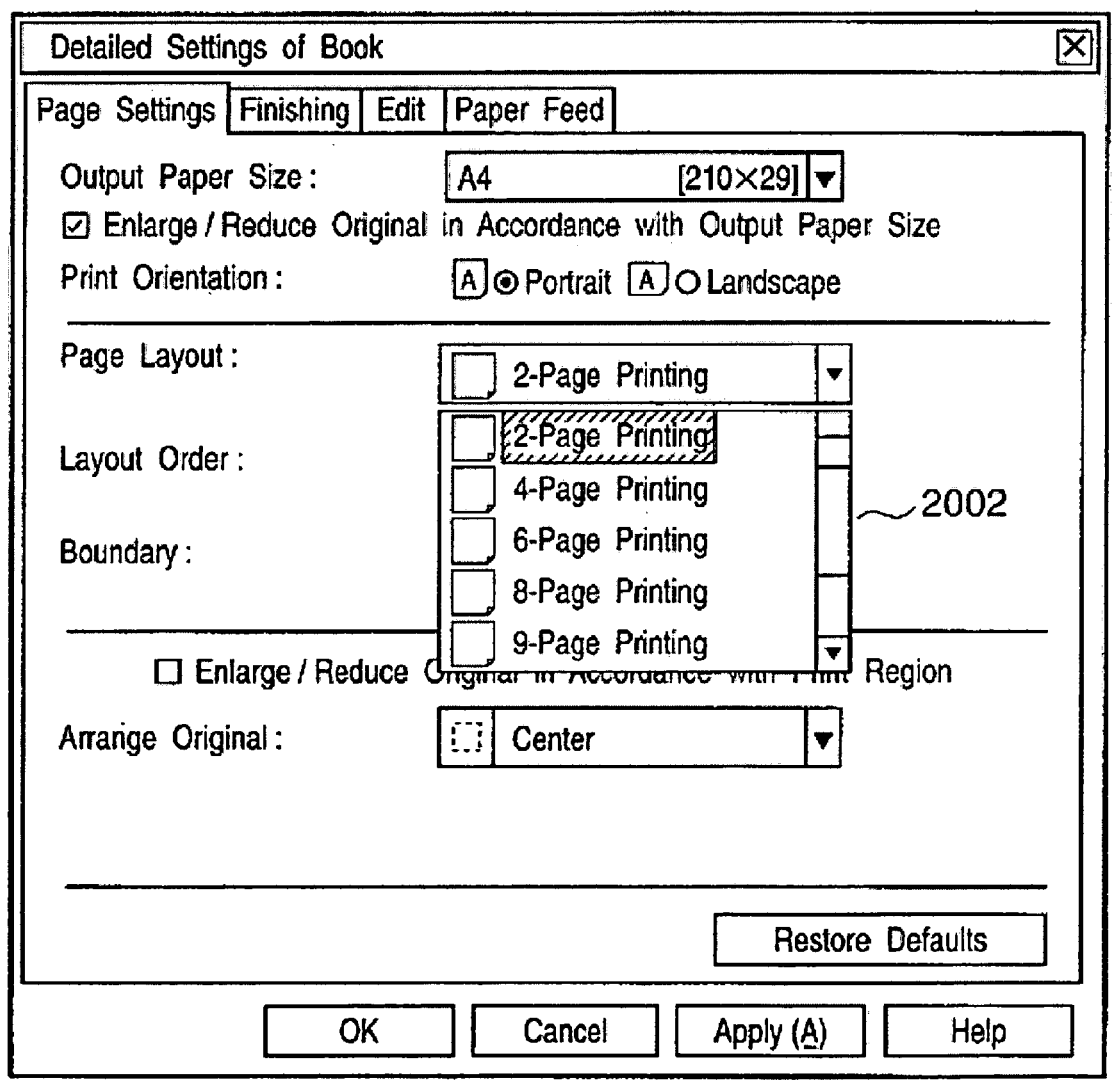
FIG. 20 is a view showing an example of a setting window for N-up printing designation.

When "page" is designated in the print target column, the print target column 1502 displays a column 1702 for designating a range by a print page, and a column 1703 for designating a range by an original page, as shown in FIG. 17 or 18. Either of the columns can be set by selecting a radio button 1704 by the user. FIG. 17 shows an example of range designation using a print page number, and FIG. 18 shows an example of range designation using an original page number.

When the range is designated by an original page number, a page number is displayed as a number obtained by hyphenating a chapter number and an original page in each chapter. The range is designated by converting the page number into a serial number. This specification concerns the system of this embodiment, and the range can also be designated by a page number itself on the preview display. In this case, the notation must take any measure to prevent confusion such that a sign representing the range is redefined to a sign other than a hyphen.

Also when the range is designated by a print page number, the range is designated by the serial number of the print page number.

In range designation using an original page and range designation using a print page, similar to designation using a chapter number, all print units including the designated page, i.e., all sheets including the designated page in single- or double-sided printing, or all booklets including the designated page in bookbinding printing are set as a print range and printed.

(4) Designation by Bundle (Booklet)

Designation by a bundle becomes effective for bookbinding printing. When bookbinding printing is designated as the printing method, as shown in FIG. 22, the user selects a "file" menu from the window of FIG. 23, and further selects a "print" item from the "file" menu. Then, a print setting UI window 2400 shown in FIG. 24 is displayed. If the user selects a "bundle (booklet)" from a print target column 2401, a bundle number designation column 2402 is displayed. The user designates a bundle to be printed in this column. The preview portion 2302 in FIG. 23 displays one bundle as a set of original pages on one column. Bundle numbers on the preview window are given in the order of bundles displayed at the preview portion 2302.

When a print target is designated by a bundle unit, all pages which constitute the designated booklet are printed in accordance with bookbinding printing procedures.

<Print Setting Procedures>

Print range setting procedures described with reference to the UI windows in FIGS. 13 to 24 will be explained with reference to the flow chart of FIG. 25 in terms of processing procedures by the bookbinding application. Procedures in FIG. 25 start when the user selects the "print setting" item from the "file menu" and the window shown in FIG. 15 is displayed.

In step S2501, selection of the print target column is checked. If the selected target is "book", the flow waits for an input. In step S2505, the flow waits for an input, and if the input is "OK button", the flow shifts to step S2506 to generate a job ticket including the entire book as a print target. As described above, the job ticket defines the layout of an original page on paper (sheet). In the job ticket structure, a document node is set at the top, and defines the attribute of the whole document such as double-sided printing/single-sided printing. A paper (sheet) node belongs to the document node, and contains attributes such as the identifier of paper for use and designation of a feed port in the printer. A print page node belongs to each paper node. One print page belongs to one sheet in single-sided printing, whereas two print pages belong to one sheet in double-sided printing. An original page laid out on a print page belongs as a leaf node to each print page node. For example, for 2-up designation, two original pages belong to one print page. The print page attribute contains the original page position and size. The job ticket has this tree structure. In step S2506, a job ticket is generated from the entire book file in accordance with the book file structure and attributes at nodes.

In step S2510, the generated job ticket is transmitted to the electronic original despooler.

If the print target is changed during waiting for an input in step S2505, the flow returns to step S2501 to repetitively check the print target.

If the print target is determined in step S2501 to be "chapter", the window in FIG. 16 is displayed in step S2502, and the flow waits for an input. If the print target is changed during waiting for an input in step S2505, the flow returns to step S2501 to repetitively check the print target.

If a chapter number is designated in the chapter designation column 1602 and the OK button is clicked, the flow advances to step S2505 to generate a job ticket for outputting all sheets including the designated chapter. For this purpose, a job ticket is generated by referring to the printing method, N-up designation, and book file structure contained in the book attributes of the book file shown in FIGS. 3A and 3B, and setting sheets including the original pages of the designated chapter as a print target.

As one method, a job ticket is temporarily generated for an entire book file. After that, only a partial tree whose top is a sheet node containing as leaf nodes original pages included in the designated chapter is left, and a partial tree whose top is another sheet node is deleted. In bookbinding printing, the print target is printed in booklets even if the range is designated by a chapter. Even a sheet including no designated chapter is subjected to printing as far as the sheet is part of booklets including the designated chapter. The sheet nodes of the job ticket are sectioned by the number of paper sheets designated as the print unit, and a job ticket is generated for, as a print target, all sheets within sections including original pages belonging to the designated chapter. A job ticket for the entire book file can be created in accordance with N-up designation in single- or double-sided printing such that N original pages are laid out on each print page. In bookbinding printing, original pages are sectioned every (bookbinding unit×4) pages, and original pages are laid out in the frame of (bookbinding unit×4) pages in the facing order every section (=bundle).

In step S2510, the generated job ticket is transmitted to the electronic original despooler 105.

If the print target is "page" in step S2501, the window in FIG. 17 is displayed in step S2503, and the flow waits for an input. If the print target is changed during waiting for an input in step S2505, the flow returns to step S2501 to repetitively check the print target.

Which of print and original pages is targeted is designated by the button 1704 in FIG. 17. For the print page, if a number is input to the print page number column 1702 and the OK button is clicked, the flow advances to step S2508. For the original page, the window in FIG. 18 is displayed, and if a page number is designated in the original page number column 1703 and the OK button is clicked, the flow advances to step S2508.

If print page numbers are designated in the print page number column 1702 and the OK button is clicked, the flow shifts to step S2508 to generate a job ticket for outputting all sheets including the designated print pages. For this purpose, a job ticket is generated by referring to the printing method, N-up designation, and book file structure contained in the book attributes of the book file shown in FIGS. 3A and 3B, and setting sheets including the designated print pages as a print target.

As one method, a job ticket is temporarily generated for an entire book file. Then, only a partial tree whose top is a sheet node containing the designated print pages is left, and a partial tree whose top is another sheet node is deleted. In bookbinding printing, the print target is printed in booklets even if the range is designated by print pages. Even a sheet including no designated print page is subjected to printing as far as the sheet is part of booklets including the designated print pages. For this reason, the sheet nodes of the job ticket are sectioned by the number of paper sheets designated as the print unit, and a job ticket is generated for a print target represented by all sheets within sections including the designated print pages.

If the print target is designated by an original page, a job ticket can be generated by the above-described method of converting a "print page" into an "original page". Since the original page number is designated by a serial number, the serial number must be converted into a chapter number and an original page number in each chapter. By conversion, an original page can be specified.

With these procedures, a job ticket is generated as the print target. In step S2510, the generated job ticket is transmitted to the electronic original despooler.

If the print target is determined in step S2501 to be "bundle", the window in FIG. 24 is displayed in step S2504, and the flow waits for an input. If the print target is changed during waiting for an input in step S2505, the flow returns to step S2501 to repetitively check the print target.

If a bundle number is designated in the bundle number designation column 2402 and the OK button is clicked, the flow advances to step S2505 to generate a job ticket for outputting all sheets included in the designated bundle. Note that a bundle can be designated only in bookbinding printing.

As one method, a job ticket for an entire book file is temporarily generated in a bookbinding printing format in which original pages are laid out on print pages in the facing order every booklet (bundle). The generated job ticket can express a bundle by a sheet node sectioned by the bookbinding unit. For example, for a bookbinding unit of two paper sheets, every two sheet nodes are sectioned in the print order, and each section corresponds to a bundle. Sheet nodes not contained in the designated bundle are deleted from the job ticket, thereby generating the job ticket including the designated bundle. In bookbinding printing, original pages are laid out in the facing order every booklet in generating a job ticket.

In step S2510, the generated job ticket is transmitted to the electronic original despooler.

With these procedures, a job ticket including a designated portion can be generated. Upon reception of the job ticket, the electronic original despooler converts the job ticket into a command complying with the output module of the operating system, and transmits the command to the output module. By using the device driver of a printer or the like which actually performs printing, the output module generates a print command in a format complying with the printer, transmits the command to the printer, and causes the printer to print data.

<Another Arrangement>

In the above embodiment, sheets including a designated range are printed in booklets in bookbinding printing. If, however, the number of paper sheets as the bookbinding unit is large or the entire book file is designated as the bookbinding unit, the advantage of a small number of paper sheets required is impaired. To prevent this, when a print range is designated by a chapter, print page, or original page, sheets including the designated range can also be printed. In this case, printing can be achieved by almost the same procedures as those described above. Processing procedures become simpler because bundles including the designated range need not be determined. This can also decrease the number of paper sheets to be printed.

The range can also be designated in the paper unit. The sheet is one of the nodes of a job ticket, and designation by sheets is always completed within a designated range. A partial job ticket including a designated range can easily be created. Since the sheet number is displayed at the upper right corner of each sheet at the preview portion, the user can easily specify a sheet on the preview window. When sheets are designated as the print range, the nodes of undesignated sheets are deleted from a job ticket for the entire book file, thereby generating a job ticket for printing the designated range. This processing is easy to perform because designated sheet numbers correspond to the order of sheet nodes in the job ticket.

This embodiment leaves only a necessary portion in a job ticket for an entire file in generating a partial printing job ticket. Only a necessary portion can be selected to reconstruct a job ticket. The resource necessary for job ticket generation can be saved by deleting an unnecessary portion while generating a job ticket for an entire book file.

<Example of Detailed Partial Printing Procedures>

As the partial printing method, it is also possible to add an instruction which designates a print range to a job ticket, and read out a job ticket portion necessary for partial printing by the electronic original despooler, instead of deleting an unnecessary portion from the job ticket. This example will be described.

(Designation of Whole Document (Book))

Figure 26:
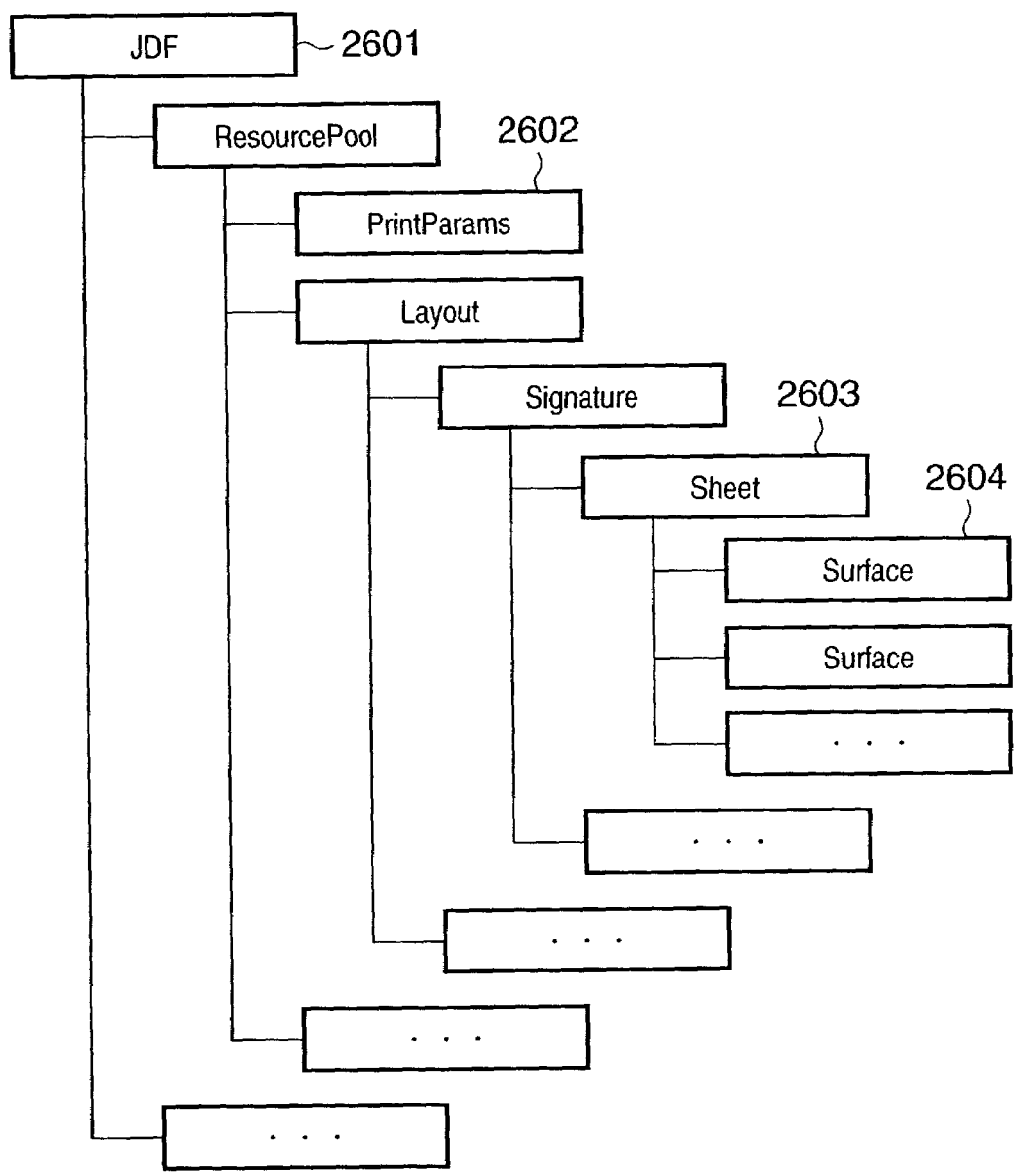
FIG. 26 is a view schematically showing an example of a job ticket format.

FIG. 26 is a view schematically showing an example of the job ticket format. In the job ticket of this example, pieces of information such as the contents of one document and a print instruction are expressed by a hierarchical structure. A print instruction is contained in "ResourcePool" 2601, and a document print instruction is described in "PrintParams" 2602 and subsequent nodes. Information about each sheet is described in "Sheet" 2603 and subsequent nodes, and information about a print page (physical page) laid out on each sheet is described in "Surface" 2604 and subsequent nodes. The "Surface" 2604 contains a layout instruction for an original page on a print page.

Figure 25:
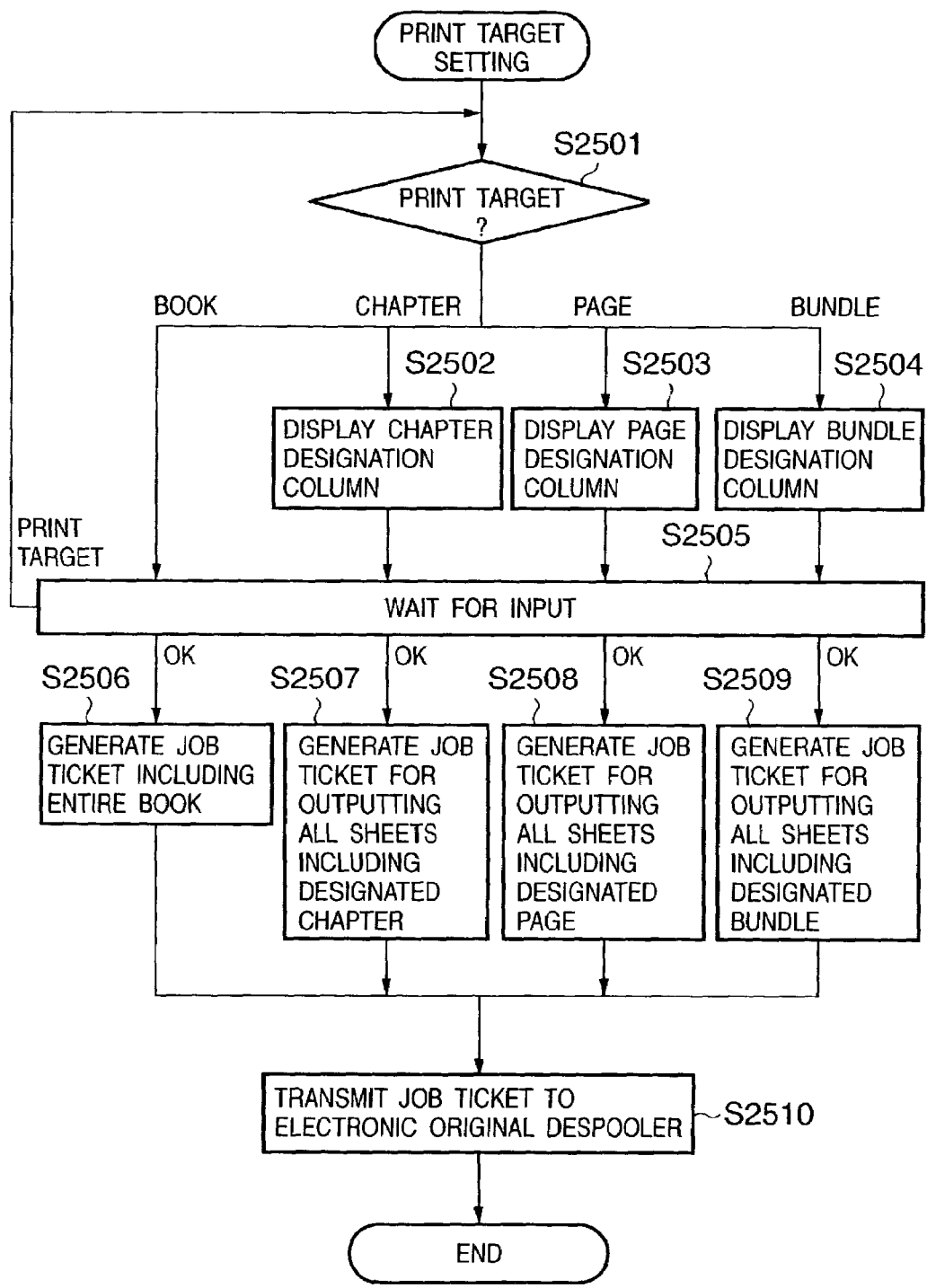
FIG. 25 is a flow chart showing procedures for designation of a print range and print control of the designated range.

In the flow chart of FIG. 25, in step S2506 of generating a job ticket for printing an entire book, a print range instruction 2701 "PrintSheetList="1~–1"" is generated, as shown in FIG. 27. In this example, a character string which represents the print range adopts the following format. In FIG. 27, the print range instruction 2701 is underlined for illustrative convenience.

Sheet numbers which designate sheets are expressed sequentially by 1, 2, 3, . . . from the first sheet of a document or by –1, –2, –3, . . . from the last sheet.

Sheet numbers subjected to printing are designated by space separation. For example, to designate the third and fifth sheets, they are expressed by "3 5".

To designate successive sheets, they can be expressed by "(first sheet number)~(last sheet number)". For example, to designate the first to third sheets, they are expressed by "1~3".

In the example of FIG. 27, the print range is designated by the description "PrintSheetList" in the sheet (paper) unit. In step S2506, "1~–1" which designates the first to last sheets is generated as range designation which designates an entire book as the output range. "1~–1" is added immediately after "PrintSheetList". The generated description "PrintSheetList="1~–1"" for designating the range is inserted into a job ticket as one of items contained in the "PrintParams" 2602.

(Designation by Chapter)

In step S2507 of generating a job ticket for printing a designated chapter, original pages included in the designated chapter are checked. Original pages can be checked using the chapter attributes and page attribute hierarchy shown in FIGS. 3A and 3B. Then, print pages on which the obtained original pages are to be laid out are checked. Print pages can be checked based on information about the original page layout (printing method, N-up printing, and the like) among the book and chapter attributes shown in FIGS. 4 and 5.

The number of original pages laid out on one surface of one sheet is N (N is the number of original pages laid out on one physical page in N-up printing designation). The number of original pages laid out on one sheet is N for single-sided printing designation or 2N for double-sided printing designation. The relationship between the number of original pages and the number of sheets is the number of original pages/N (single-sided designation) or the number of original pages/2N (double-sided designation). If paper change is designated between chapters, a new chapter is always printed on a new sheet. If a page break is designated between chapters, a new chapter is always printed on a new print page. Considering these settings, sheets including the designated chapter are specified. More specifically, step S2507 can employ the following procedures as an example.

(1) The number (P) of sheets is counted for a chapter before the designated chapter. The number (P) of sheets is calculated based on the number of sheets of a chapter=the number of original pages included in the chapter/N (single-sided designation) or the number of original pages/2N (double-sided designation). When double-sided printing is designated and a page break between chapters is not designated, the number of sheets is calculated not for each chapter but for successive chapters at once. The number of original pages included in the chapter corresponds to the number of leaf nodes branched from the chapter nodes 302A and 302B in FIG. 3A.

(2) If paper change is designated between chapters, the next chapter is printed on a new sheet (P+1).

(3) If a page break is designated between chapters, the next chapter is printed on the lower surface of the same sheet (P) as that of the last page of the previous chapter in double-sided designation, or printed on a new sheet (P+1) in single-sided printing designation.

(4) (1) to (3) are repeated for all chapters before the designated chapter to obtain a sheet (Pstart) to which the first page of the designated chapter belongs.

(5) The number (P') of sheets is counted following the same procedure as procedure (1) for the designated chapter.

(6) The print range is set to "Pstart~Pstart+P'".

By these procedures, a range designated by a chapter can be converted into sheets. When a plurality of chapters are designated, the procedures can be independently applied to the designated chapters.

The procedures are also executed to display a GUI window as shown in FIG. 21. If the correspondence between sheets, original pages, and a chapter is determined in the display of the GUI window, the information is saved. When a print range is designated, the sheet range can be determined by referring to the saved information.

In bookbinding printing designation, the print range based on a chapter is designated by bundles. Bundles including the designated chapter are made to correspond to a sheet range, thus determining the sheet range to be printed. In bookbinding printing designation, the number of sheets of one bundle ×4 equals the number of original pages printed on one bundle. If paper change is designated between chapters and the last page number of the chapter is an odd number, the number of bundles to which only a chapter before the designated chapter belongs is determined on the assumption that a blank page is inserted immediately after the last page. The number of bundles counted in this way is multiplied by the number of sheets of one bundle and converted into the number (P) of sheets.

The first sheet number (P+1) of a bundle to which the designated chapter belongs is the start of a range to be printed. The number of bundles including the designated chapter is immediately obtained from the number of original pages of the designated chapter. At this time, the number of bundles is determined including the number of original pages of a chapter other than the designated chapter that is contained in the first bundle. The last sheet of the last bundle including the designated chapter is the end of the range to be printed.

The range determined in this fashion is added immediately after "PrintSheetList", and the resultant description is inserted in the "PrintParams" 2602.

For example, when the second chapter of the double-sided 1-up document shown in FIG. 19 is designated as the print target, the number of sheets of a chapter before the designated second chapter, i.e., the first chapter is three. Original pages included in the second chapter are five pages 2-1 to 2-5, and sheets on which these original pages are laid out are three sheets 2 to 4. In this case, the print range can be designated by an expression "PrintSheetList="2~4"".

(Designation by Original Page)

In step S2508 of generating a job ticket for printing a designated page (original page), a print page on which the designated original page is laid out is checked. This processing is the same as processing executed when a chapter is designated. More specifically, almost the same procedures in chapter designation can be adopted by replacing "chapter" in (1) to (6) with "original page". In procedure (1), the number of sheets per original page is calculated. In step S2508, the calculated value must be multiplied by the number of original pages before the designated original page, thereby converting the print range into the number of sheets.

If the converted number of sheets is not an integer, the designated original page may be printed on the same sheet as the preceding page. The print range must be adjusted in accordance with chaptering designation.

(a) When neither page break nor paper change of chaptering is designated, the integer part of the converted number of sheets corresponds to the number of sheets before a sheet on which the designated original page is to be printed.

(b) If a page break is designated, the number of original pages obtained from data in FIGS. 3A and 3B is not directly adopted as the number of pages of a chapter of interest. Instead, a minimum multiple of N larger than the number of pages of the chapter of interest is adopted as the number of original pages of the chapter of interest. Then, the number of original pages is converted into the number of sheets by the above-described procedures. This also applies to a case wherein paper change and single-sided printing are designated. When paper change and double-sided printing are designated, a minimum multiple of 2N larger than the number of pages of a chapter of interest is adopted as the number of pages of the chapter of interest. Note that N represents the number of original pages laid out on one print page in N-up printing designation. This procedure converts a blank generated by chaptering into a blank original page.

Assume that original pages 2-1 and 2-5 of the document shown in FIG. 19 are designated as the print target. Since double-sided printing is designated, the number of sheets per original page is ½. Since chaptering is not designated, the number of sheets before the designated page 2-1 is the integer part of 3/2 (=3 (number of original pages)×½ (number of sheets/original page)), i.e., P=1. A sheet including the designated original page is P+1=the second page. Similarly, original page 2-5 is included in the fourth sheet. That is, sheets including the designated original pages are two sheets 2 and 4. In this case, the print range is designated by an expression "PrintSheetList="2 4"".

(Designation by Bundle (Booklet))

In step S2509 of generating a job ticket for printing a bundle designated in bookbinding printing, sheets including the designated bundle are obtained. For example, to print the second bundle in an instruction of sectioning bundles every five sheets in bookbinding printing, five sheets 6 to 10 are subjected to printing. The print range is designated by an expression "PrintSheetList="6~10"".

The electronic original despooler receives the job ticket generated by the above processing, and determines that the print target is only sheets designated by "PrintSheetList". The electronic original despooler converts the job ticket into a command complying with the output module of the operating system in accordance with an instruction which designates only the corresponding sheets. Then, the electronic original despooler transmits the command to the output module. FIGS. 28A to 28C show one job ticket. In the example of the job ticket shown in FIGS. 28A to 28C, "PrintSheetList="1" (print the first sheet)" in "PrintParams" is read out. Only a sheet belonging to "Signature" of designated "Layout" (only bold "Signature" portion in FIG. 28B) is set as the print target, and a command is generated.

In this fashion, sheet information to be printed can be added to designate a print range, in place of expressing, by job tickets which designate sheets to be printed, print ranges designated by a plurality of print range designation methods and removing unnecessary portion from the job tickets. An arbitrary portion of a document can be designated as the print target by only rewriting part of a job ticket. A job ticket which designates a print range can be created easily (high speed), and the print range can be changed.

<Print Processing in Electronic Original Despooler>

Print processing in the electronic original despooler will be explained in more detail. The electronic original despooler converts drawing data of an original page into an OS output command (e.g., Windows GDI command) in accordance with a print instruction, and transfers a drawing command to the printer via the printer driver.

A job ticket describes sheet information sequentially from the first sheet. To print the Nth sheet, the Nth "Sheet" portion from the start of the job ticket is read out to acquire sheet information of the print target. "Sheet" contains one "Surface" for single-sided printing and two "Surface"s for double-sided printing. "Surface" describes information of a print page (physical page). Further, "Surface" contains "ContentObject" which is information about an original page to be drawn on the print page.

Figure 29:
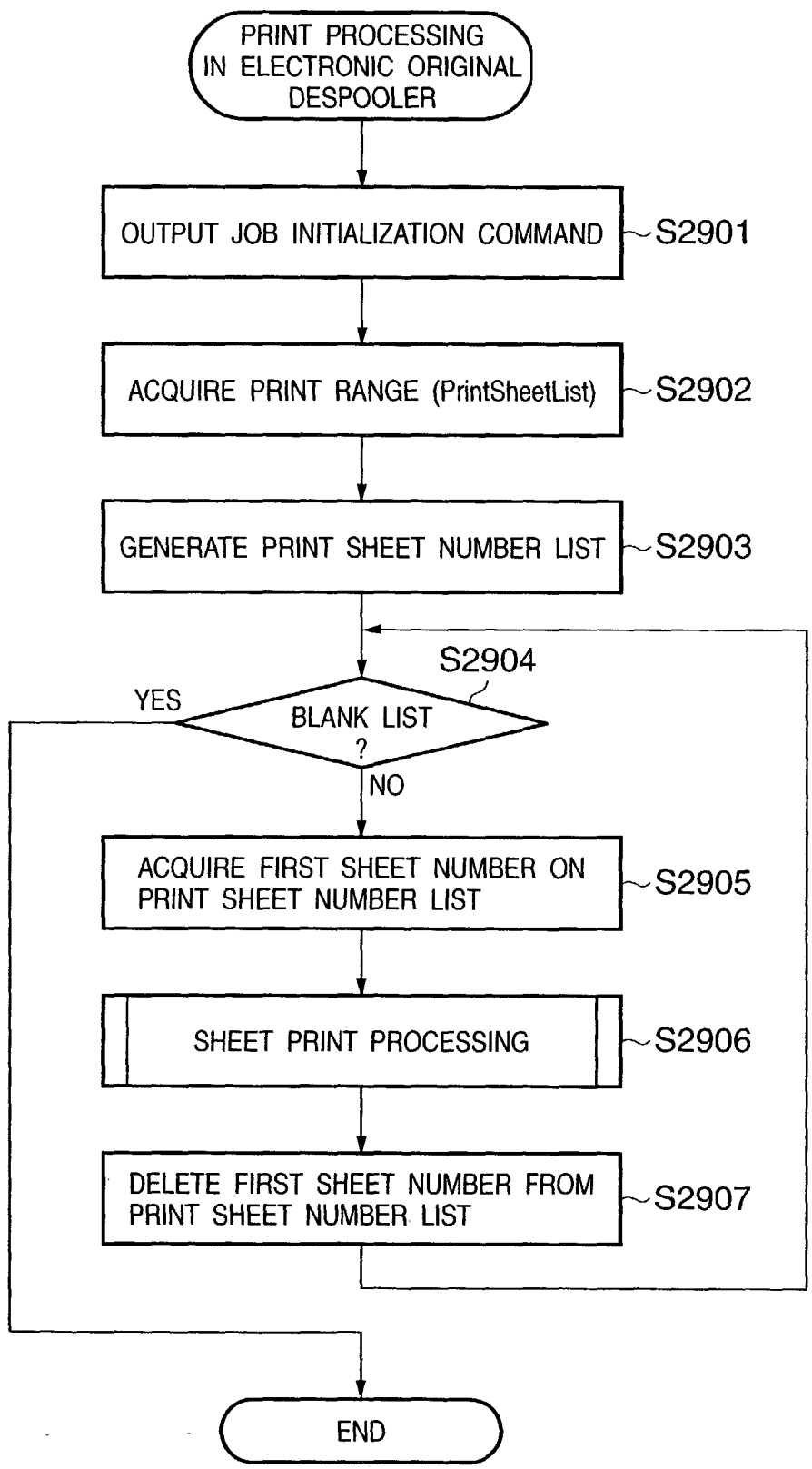
FIG. 29 is a flow chart showing print processing in an electronic original despooler.

FIG. 29 shows the flow chart of print processing in the electronic original despooler. In step S2901, the electronic original despooler acquires, from a job ticket, information necessary to output a job initialization command. The initialization command is formed from parameters designated for a whole print job, such as information for identifying a destination printer, designated resolution, and the number of copies. The initialization command is designated in "PrintParams" or "Device" subsequent to "ResourcePool" of the job ticket. The electronic original despooler acquires these values, designates an output destination printer in accordance with the print processing method of the OS, and outputs parameters such as resolution and the number of copies designated for the entire job. In step S2902, the electronic original despooler acquires a "PrintSheetList" value from the job ticket in order to acquire the print range. In step S2903, the electronic original despooler generates a list of sheet numbers to be actually printed on the basis of the "PrintSheetList" contents. For example, for PrintSheetList="1~3 6 8~10", the electronic original despooler generates a list of sheet numbers to be printed (1, 2, 3, 6, 8, 9, 10). In steps S2904 to S2907, the electronic original despooler extracts the first sheet number on the list (step S2905), performs print processing of the sheet (step S2906), and deletes the first sheet number from the list (step S2907). The electronic original despooler repetitively performs this processing until print processing of all sheets included in the list ends. When the print range is all sheets, the electronic original despooler can print the sheets sequentially from the first sheet without processing of generating a list and specifying sheets to be printed.

Figure 30:
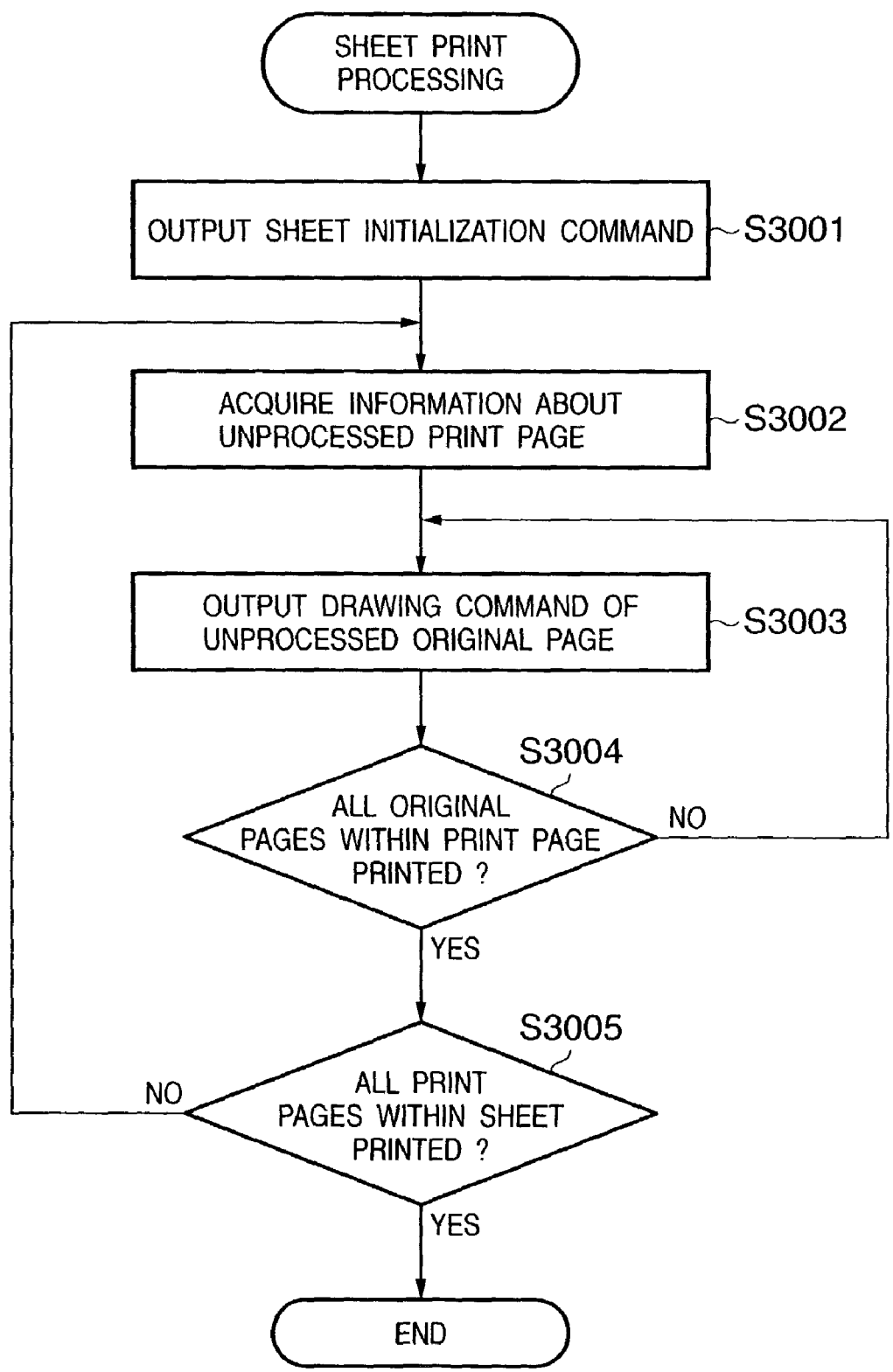
FIG. 30 is a flow chart showing sheet print processing.

FIG. 30 shows the flow chart of sheet print processing in step S2906 of FIG. 29. "Signature" 2605 in FIG. 26 contains the definition of sheet attributes (e.g., paper size and feed port), and is constituted to contain sheets having the same sheet attribute. In step S3001, the electronic original despooler reads out "Signature" information containing a sheet designated as the print target. If the sheet attribute is different from a preceding state, the electronic original despooler outputs a command (paper size or feed port change command or the like) in accordance with the print processing method of the OS.

In step S3002, the electronic original despooler acquires print page (Surface) information which is included in the sheet (Sheet) to be printed and whose print command has not been output yet. FIG. 31 shows a sample of the "Sheet" 2603. The "Sheet" contains two "Surface"s 3101 and 3102, which represent print pages on the upper and lower surfaces of one sheet. In step S3002, the electronic original despooler reads out pieces of print page information ("Surface"s 3101 and 3102) on the surfaces, and further reads out pieces of original page information ("ContentObject" 3103) contained in the print pages. The electronic original despooler converts drawing information contained in the original pages into a command complying with the output module of the OS, and executes print processing. "Ord" of "ContetnObject" represents an original page number. The electronic original despooler converts a drawing object such as a text, graphic, or image included in an original page represented by the original page number into a print command in accordance with the OS. The printer driver converts the print command into a drawing command interpretable by the printer, and printing is executed. In the example of FIG. 31, "Ord" represents original page numbers 0, 1, 2, and 3.

Figure 32:
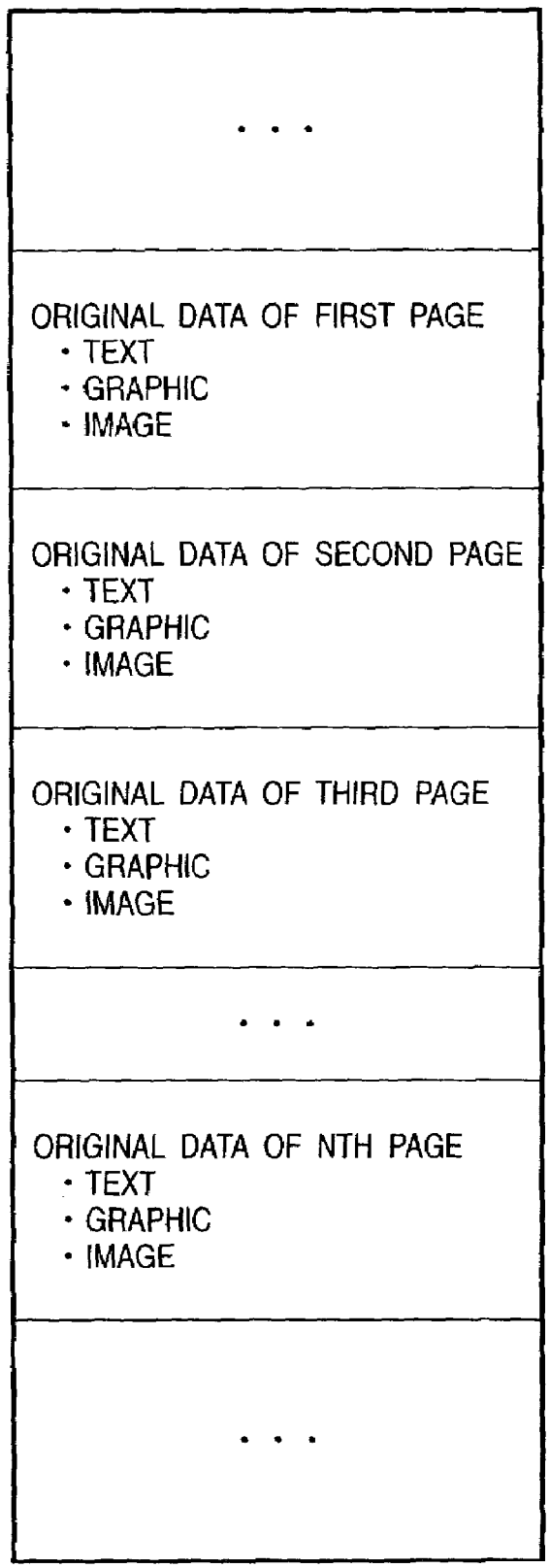
FIG. 32 is a view for explaining an example of an original data structure.

FIG. 32 shows an example of the original data structure. Drawing objects included in each original page are recorded for each original page. The attributes (font attribute, line attribute, and the like) of a text and graphic referred to by a drawing object may be recorded at a portion other than original pages in order to share these attributes between a plurality of drawing objects, and each original page portion may have only link information to attributes. This structure enables efficiently saving data. In step S3003, the electronic original despooler acquires the drawing objects of the designated original from original data on the basis of original page numbers which are designated by "Ord" of "ContentObject" and acquired in step S3002. The electronic original despooler converts the drawing objects into a print command in accordance with the OS.

In the example of FIG. 31, one "Surface" contains two "ContentObject"s, which means 2-up printing (two original pages are imposed on one print page). CTM designation contained in "ContentObject" of FIG. 31 represents affine transformation, which means an instruction of designating the position, size, and rotation angle and laying out the drawing contents of an original page on a print page. Although details will be omitted, it is possible to designate the drawing position, size, and rotation angle in accordance with the OS, convert a drawing object included in an original page into a print command, and draw the object on a print page. Steps S3003 and S3004 are repetitively executed for all original pages included in the print page, thereby generating a print page drawing command. In double-sided printing, one sheet includes two print pages, and processing from steps S3002 to S3005 is executed for the lower surface. In this manner, print processing of one sheet can be executed.

FIG. 33 shows an example of print data which is generated by the printer driver and transmitted to the printer. Reference numeral 3301 denotes a job initialization command portion output in step S2901 of FIG. 29; 3302 and 3306, sheet initialization command portions output in step S3001 of FIG. 30; and 3303, 3304, 3305, and 3307, drawing commands each for one print page output in steps S3002 to S3005 of FIG. 30.

Print data can be generated in accordance with a print range designated by a job ticket, and only print data of a designated sheet can be printed.

<Advantages of System of Embodiment>

As described above, printing of only a desired portion can be designated by a page number, chapter number, or bundle while a preview image displayed on the preview portion is checked. Since the preview window displays a preview image which faithfully expresses a layout to be printed out, the user can accurately designate a print range by referring to the preview image.

The range can be designated in various units such as a chapter, print page, original page, and booklet. The user can select a target print range or a unit which facilitates specifying a replacement portion after printing.

Together with a designated range, an undesignated portion to be printed on the same sheet as that of the range is also printed. Only by designating a page or chapter whose contents have been changed, the user can print the changed page or chapter in sheets or booklets to be replaced. This provides high operability and minimizes designation errors of the print range. In bookbinding printing, the page or chapter is printed in booklets including the designated range, which greatly facilitates replacement. In bookbinding printing, the page or chapter is printed in sheets including the designated range, which prevents excessively increasing a necessary number of paper sheets.

As has been described above, the present invention can facilitate designating a target print range in a document, and increase the availability and productivity.

When a target print range is designated, an original page to be printed on the same sheet as that of the range is also printed. Sheet replacement work after printing can be easily performed.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus which sets, for document data including a plurality of original pages, print setting information including print format setting information to be applied to print processing performed by a printing apparatus, comprising:
  a print setting unit adapted to set the print format setting information indicating a number of original pages to be laid out on a single print sheet;
  a designation unit adapted to designate a print range to be printed using serial numbers which indicate an output order of print sheets on which the document data is printed by said printing apparatus, wherein the output order is the output order of print sheets output in a case where said document data of all original pages and said print format setting is used;
  a determination unit adapted to determine original pages to be laid out on a print sheet corresponding to the serial numbers designated by said designation unit using the print format setting information set by said setting unit and the serial numbers designated by said designation unit; and
  a control unit adapted to control an output such that the printing apparatus performs the print processing based on the document data corresponding to all original pages to be laid out on the print sheet determined by said determination unit.

2. An apparatus according to claim 1, further comprising:
  a selection unit adapted to select a method for designating the range to be printed from a first method and a second method, the first method using the original page generated by an application and the second method using the serial number of the print sheet to be printed by the printing apparatus,
  wherein, when the second method is selected by said selection unit, said designation unit designates the range to be printed by the serial number of the print sheet to be printed by the printing apparatus, and
  wherein, when the first method is selected by said selection unit, said designation unit designates the range to be printed by the original page.

3. An apparatus according to claim 1, further comprising a print preview unit adapted to display a preview image of each original page of the document data according to the print format setting set by said print setting unit, in advance of printing.

4. An apparatus according to claim 1, further comprising a print preview unit adapted to display a preview image of each original page of the document data in units of booklet in an opening direction of the booklet according to the print format setting set as the bookbinding setting by said print setting unit, in advance of printing.

5. An information processing apparatus which sets print format setting information for document data including a plurality of original pages, comprising:
  a print setting unit adapted to set bookbinding printing information as the print format setting information, wherein the bookbinding printing information is setting information for outputting a booklet made by folding a designated number of print sheets in two;
  a designation unit adapted to designate a printing range to be printed by designating a serial number indicating an output order of the booklet in which the document data is printed in a case where the bookbinding printing information, where said document data is divided into a plurality of booklets, is set as the print format setting information, wherein the output order is an output order of the booklets output in a case where all original pages of said document data and said print format setting information is used;
  a determination unit adapted to determine which original page is laid out in the designated booklet, based on the printing range designated by said designation unit; and
  a control unit adapted to control an output such that a printing apparatus performs print processing based on the document data corresponding to all original pages to be laid out on the booklet determined by said determination unit.

6. An information processing method of setting, for document data including a plurality of original pages, print setting information including print format setting information to be applied to print processing performed by a printing apparatus, comprising:

a print setting step of setting the print format setting information indicating a number of original pages to be laid out on a single print sheet;

a designation step of designating a print range to be printed using serial numbers which indicate an output order of print sheets on which the document data is printed by said printing apparatus, wherein the output order is the output order of print sheets output in a case where said document data of all original pages and said print format setting is used;

a determination step of determining original pages to be laid out on a print sheet corresponding to the serial numbers designated in said designation step using the print format setting information set in said setting step and the serial numbers designated in said designation step; and a control step of controlling an output such that the printing apparatus performs the print processing based on the document data corresponding to all original pages to be laid out on the print sheet determined in said determination step.

7. A method according to claim 6, further comprising:

a selection step of selecting a method for designating the range to be printed from a first method and a second method, the first method using the original page generated by an application and the second method using the serial number of the print sheet to be printed by the printing apparatus, wherein, when the second method is selected in said selection step, said designation step designates the range to be printed by the serial number of the print sheet to be printed by the printing apparatus, and wherein, when the first method is selected in said selection step, said designation step designates the range to be printed by the original page.

8. A method according to claim 6, further comprising a print preview step of displaying a preview image of each original page of the document data in advance of printing in accordance with the print format setting set in said print setting step.

9. An information processing method of setting print format setting information for document data including a plurality of original pages, comprising:

a print setting step of setting bookbinding printing information as the print format setting information, wherein the bookbinding printing information is setting information for outputting a booklet made by folding a designated number of print sheets in two;

a designation step of designating a printing range to be printed by designating a serial number indicating an output order of the booklet in which the document data is printed in a case where the bookbinding printing information, when said document data is divided into a plurality of booklets, is set as the print format setting information, wherein the output order is an output order of the booklets output in a case where all original pages of said document data and said print format setting information is used;

a determination step of determining which original page is laid out in the designated booklet, based on the printing range designated in said designating step; and a control step of controlling an output such that a printing apparatus performs print processing based on the document data corresponding to all original pages to be laid out in the booklet determined in said determination step.

10. A method according to claim 9, further comprising a print preview step of displaying a preview image of each original page of the document data in units of booklet in an opening direction of the booklet, in advance of printing according to the print format setting set as the bookbinding setting in said print setting step.

11. A computer program stored in a computer-readable storage medium for causing a computer to set, for document data including a plurality of original pages, print setting information including print format setting information to be applied to print processing performed by a printing apparatus, said program comprising:

print setting procedure code for setting the print format setting information indicating a number of original pages to be laid out on a single print sheet;

designation procedure code for designating a print range to be printed using serial numbers which indicate an output order of print sheets on which the document data is printed by said printing apparatus, wherein the output order is the output order of print sheets output in a case where said document data of all original pages and said print format setting is used;

determination procedure code for determining original pages to be laid out on a print sheet corresponding to the serial numbers designated by said designation procedure code using the print format setting information set by said print setting procedure code and the serial numbers designated by said designation procedure code; and control procedure code for controlling an output such that the printing apparatus performs the print processing based on the document data corresponding to all original pages to be laid out on the print sheet determined by said determination procedure code.

12. A computer program stored in a computer-readable storage medium for causing a computer to set print format setting information document data including a plurality of original pages, said program comprising:

print setting procedure code for setting bookbinding printing information as the print format setting information, wherein the bookbinding printing information is setting information for outputting a booklet made by folding a designated number of print sheets in two;

designation procedure code for designating a printing range to be printed by designating a serial number indicating an output order of the booklet in which the document data is printed in a case where the bookbinding printing information, when said document data is divided into a plurality of booklets, is set as the print format setting information, wherein the output order is an output order of the booklets output in a case where all original pages of said document data and said print format setting information is used;

determination procedure code for determining which original page is laid out in the designated booklet, based on the printing range designated in said designating step; and a control unit adapted to control an output such that a printing apparatus performs print processing based on the document data corresponding to all original pages to be laid out in the booklet determined by said determination procedure code.

* * * * *

UNITED STATES PATENT AND TRADEMARK OFFICE
CERTIFICATE OF CORRECTION

PATENT NO. : 7,394,562 B2
APPLICATION NO. : 10/236553
DATED : July 1, 2008
INVENTOR(S) : Nakagiri et al.

It is certified that error appears in the above-identified patent and that said Letters Patent is hereby corrected as shown below:

COVER SHEET:
 Foreign Patent Documents,
 "2001084544 A" should read -- 2001-0084544 A --;
 "895184 A2" should read -- 0 895 184 A2 --;
 "071288 A2" should read -- 0971288 A2 --;
 "2000025276 A" should read -- 2000-025276 A --; and
 "2000218889 A" should read -- 2000-218889 A --.

COLUMN 9:
 Line 26, "U1" should read -- UI --.

COLUMN 22:
 Line 36, ""ContetnObject"" should read -- "ContentObject" --.

Signed and Sealed this

Thirteenth Day of January, 2009

JON W. DUDAS
*Director of the United States Patent and Trademark Office*